(12) United States Patent
Hashimoto et al.

(10) Patent No.: US 8,724,965 B2
(45) Date of Patent: *May 13, 2014

(54) REPRODUCTION DEVICE

(75) Inventors: Satoshi Hashimoto, New Jersey, NJ (US); Masahiro Oashi, Kyoto (JP); Hiroaki Iwamoto, New Jersey, NJ (US)

(73) Assignee: Panasonic Corporation, Osaka (JP)

( * ) Notice: Subject to any disclaimer, the term of this patent is extended or adjusted under 35 U.S.C. 154(b) by 729 days.

This patent is subject to a terminal disclaimer.

(21) Appl. No.: 12/609,095

(22) Filed: Oct. 30, 2009

(65) Prior Publication Data

US 2010/0046920 A1 Feb. 25, 2010

Related U.S. Application Data

(63) Continuation of application No. 10/596,107, filed as application No. PCT/JP2005/008531 on May 10, 2005, now Pat. No. 8,238,714.

(30) Foreign Application Priority Data

May 11, 2004 (JP) .................................. 2004-141558

(51) Int. Cl.
*H04N 9/80* (2006.01)
(52) U.S. Cl.
USPC ............ 386/241; 386/239; 386/240; 386/248
(58) Field of Classification Search
USPC .................. 386/239–248, 332–336, 353–357
See application file for complete search history.

(56) References Cited

U.S. PATENT DOCUMENTS

| | | | |
|---|---|---|---|
| 5,699,472 A | 12/1997 | Ueda | |
| 5,845,075 A | 12/1998 | Uhler et al. | |
| 5,870,523 A * | 2/1999 | Kikuchi et al. | 386/241 |
| 5,973,706 A | 10/1999 | Takeuchi | |
| 6,269,373 B1 * | 7/2001 | Apte et al. | 1/1 |
| 6,373,534 B1 | 4/2002 | Yasuki et al. | |
| 6,572,475 B1 | 6/2003 | Okabe et al. | |
| 6,763,178 B1 | 7/2004 | Suzuki et al. | |

(Continued)

FOREIGN PATENT DOCUMENTS

| | | |
|---|---|---|
| EP | 0 891 081 A2 | 1/1999 |
| EP | 1089199 | 4/2000 |

(Continued)

OTHER PUBLICATIONS

U.S.A. (U.S. Appl. No. 10/596,107) Office action, mail date is Apr. 30, 2012.

(Continued)

*Primary Examiner* — Hung Dang
(74) *Attorney, Agent, or Firm* — Greenblum & Bernstein, P.L.C.

(57) ABSTRACT

A playback apparatus has a platform 1410 that is a program execution environment of an application 1400. When the platform 1410 initiates the application 1400, a graphics information transmission unit 1403, which corresponds to an API function, obtains graphics information and stores the graphics information in a graphics information storage unit 1413. A graphics information control unit 1414 selects graphics information to be rendered, based on a stream event obtained by a stream event reception unit 1416 and the graphics information stored in the graphics information storage unit 1413. The graphics information control unit 1414 has a graphics rendition unit 1415 render the selected graphics with a video playback timing relating to the stream event.

4 Claims, 22 Drawing Sheets

(56) References Cited

U.S. PATENT DOCUMENTS

| | | | |
|---|---|---|---|
| 7,401,100 B2 * | 7/2008 | Jung et al. ............................. 1/1 |
| 7,764,868 B2 * | 7/2010 | Okada et al. ................. 386/241 |
| 7,769,275 B2 | 8/2010 | Seo et al. |
| 2002/0135621 A1 | 9/2002 | Angiulo et al. |
| 2002/0145702 A1 | 10/2002 | Kato et al. |
| 2004/0047592 A1 | 3/2004 | Seo et al. |
| 2004/0252981 A1 * | 12/2004 | Murayama .................... 386/111 |
| 2006/0143666 A1 * | 6/2006 | Okada et al. ..................... 725/89 |
| 2006/0188233 A1 | 8/2006 | Matsumura et al. |
| 2006/0245742 A1 * | 11/2006 | Ashley et al. ................. 386/126 |
| 2007/0088752 A1 * | 4/2007 | Seo et al. ................... 707/104.1 |

FOREIGN PATENT DOCUMENTS

| | | |
|---|---|---|
| EP | 1 089 199 A2 | 4/2001 |
| EP | 1 104 128 A1 | 5/2001 |
| EP | 1 128 674 A1 | 8/2001 |
| JP | 8-256322 | 10/1996 |
| JP | 2001-157175 | 6/2001 |
| JP | 2001-092971 | 4/2005 |
| JP | 2005-092971 | 4/2005 |
| JP | 2005-92971 A | 4/2005 |
| TW | 200405303 | 4/2004 |
| WO | WO 2004/025651 A1 * | 3/2004 ............. G11B 27/00 |

OTHER PUBLICATIONS

Office Action issued on Sep. 15, 2011, by USPTO in U.S. Appl. No. 10/596,107.
English Language Abstract of JP 2001-157175, Jun. 8, 2001.
English Language Abstract of JP 2001-092971, Apr. 7, 2005.
Taiwanese Office Action dated Aug. 23, 2011.
European Office Action dated Sep. 13, 2011, for EP 05 73 9195.

* cited by examiner

REPRODUCTION DEVICE

CROSS-REFERENCE RELATED TO APPLICATION

This application is a continuation of pending U.S. patent application Ser. No. 10/596,107, filed on May 31, 2006, which is a National Stage Application of International Application No. PCT/JP2005/008531, filed May 10, 2005, which claims priority to Japanese Application No. 2004/141558, filed May 11, 2004, which are expressly incorporated herein by reference in their entireties.

TECHNICAL FIELD

The present invention relates to a playback apparatus for AV (audio video) data recorded on a recorded medium, and in particular to a technique for rendering graphics in coordination with video of AV data being played, in a case in which a program for rendering graphics is stored on the recording medium.

BACKGROUND ART

Conventional techniques for efficiently managing timing of a plurality of media, such as audio and video, in order to temporally synchronize the media include a technique proposed by Japanese Laid-Open Patent Application 2001-157175.

A plurality of media can be efficiently synchronized with use of this technique.

Further, it is envisioned that in the near future instead of simply synchronizing plurality of media, recording media such as BD-ROMs will store contents that include AV data such as video and audio as well as Java applications, and as such, will provide a variety of services.

One example of such services that are conceived is rendering of graphics in coordination with playback of AV data, where the Java application is a graphics rendering application. It is desirable to provide services such as graphics rendering that are finely-tuned in response to user operations.

However, conventional techniques are unable to render graphics of applications in coordination with images being played, or render graphics in response to user operations.

DISCLOSURE OF THE INVENTION

An object of the present invention is to provide a playback apparatus that, in cases in which both an application and AV data such as video are recorded on a recording medium, renders application graphics in coordination with video and the like of AV data being played.

The present invention is a playback apparatus that plays a video stream recorded on a recording medium on which is also recorded a computer program that is to be executed during playback of the video stream, the video stream including control information for specifying a location on a time axis relating to playback timing of video, and the computer program including predetermined codes for designating a plurality of images and, for each image, a corresponding rendition time at which the image is to be rendered, the playback apparatus including: a storage unit; a playback unit operable to successively play video that composes the video stream, according to a playback timing relating to the control information; a program execution unit operable to successively interpret and execute each of codes that compose the computer program, wherein interpreting and executing with respect to the predetermined codes is a procedure of storing, in the storage unit, the images designated by the predetermined codes and the corresponding rendition time of each designated image; an image selection unit operable to compare (a) a specified location that is a location, on a time axis relating to playback timing of the video currently being played, which is specified based on the control information, with (b) each of the stored corresponding rendition times, and if, based on a comparison result, one or more images are to be rendered, select the one or more images; and a rendition unit operable to, if one or more images have been selected by the image selection unit, render the one or more images during playback of the video.

Here, playback of a video stream denotes playing video that composes the video stream. Playing denotes performing control to display that video. For example, if video data showing the video is compressed moving images, playing is outputting a decompressed video signal to a display apparatus. Note that the display apparatus may exist in the playback apparatus or be external thereto.

Furthermore, rendition denotes performing control to display an image, and may be storing of image data to an image memory, or outputting, to a display apparatus, a signal expressing an image. Note that when an image is rendered during playback of video, the image is displayed by being composited with the video, for example, by the video and the image being superimposed.

Furthermore, a time axis relating to playback timing is a time axis that shows playback time of video in video stream data being played from a recording medium.

According to the stated structure, in the playback apparatus of the present invention, by the program execution unit executing predetermined codes that include information such as images to be rendered during playback of the video stream, and storing the information of the images to be rendered in the storage unit, the image selection unit can select, from among images stored in the storage unit, an image to be rendered with the playback timing of the video played by the playback unit, and the rendition unit can render, at the playback timing, the selected image together with the played video played.

Therefore, if, for example, the played video is used as a background for a game application, the graphics of the game application can be displayed in coordination with the video being played.

Furthermore, the playback apparatus may further include: a processor; and an image memory for storing images that compose a screen to be displayed, wherein the program execution unit implements the interpreting and execution by converting the codes into machine language instructions that are executable by the processor, and causing the processor to execute the instructions, the image selection unit performs the comparison by causing the processor to execute a predetermined comparison-use machine language instruction sets, and the rendition unit performs the rendition by, if one or more images have been selected by the image selecting unit, transferring the selected one or more images from the storage unit to the image memory.

Here, the image memory is a type of memory from which a screen display-use signal based on a group of images stored therein is output. This signal is conveyed to the display apparatus which displays the group of images.

According to the stated structure, the program execution unit first converts the codes of the program into machine language instructions that are executable by the processor, and, instead of having the resultant machine language instructions executed, has an image or images selected using predetermined machine language instruction sets. Therefore, images can be selected at high speed.

Furthermore, the predetermined codes may be for designating each rendition start time by using a rendition start time and a rendition end time, the program execution unit may implement the execution of the predetermined codes by storing, in the storage unit, pieces of image data and rendition time data in correspondence, each piece of image data showing a different one of the images, and each piece of rendition time data showing the rendition start time and the rendition end time of the image shown by the corresponding piece of image data, and the image selection unit may select one or more images that are shown by image data that has corresponding rendition time data in which a range defined by the rendition start time through to the rendition end time encompasses the specified location.

According to the stated structure, the image selection unit can select an image for which a range from the rendition start time through to the rendition end time encompasses the playback timing of the video, and therefore images can be selected with a broad range of choice. Furthermore, the selected image can be displayed between the rendition start time and the rendition end time.

Furthermore, the control information may further include condition information that shows a predetermined condition judgment criterion in correspondence with at least one location on the time axis, and the image selection unit may select each of the one or more images only when (a) a predetermined relationship is satisfied between the rendition time of the image and the specified location, and, in addition, (b) if the specified location has corresponding condition information, a predetermined condition is satisfied based on the condition information.

According to the stated structure, the control information includes, for example, condition information such as an identifier and coordinates of an image to be rendered with the playback timing of the video. Therefore, the image selection unit can select, from among the images stored in the storage unit, an image or images that not only fit the playback timing of the video but that also match the condition information.

Furthermore, the predetermined codes may be for further designating sets of image rendition coordinates, each image being in correspondence with a set of image rendition coordinates, the program execution unit may further implement the interpreting and execution by storing, in the storage unit, each designated set of image rendition coordinates in correspondence with the corresponding image, the condition information may include a set of coordinates, and the image selection unit may select each of the one or more images only when (a) a predetermined relationship is satisfied between the rendition time of the image and the specified location, and, in addition, (b) if the specified location has corresponding condition information, the set of image rendition coordinates stored in correspondence with the image and the set of coordinates in the condition information fall within a predetermined proximity of each other.

According to the stated structure, since the condition information includes coordinates, the image selection unit can select, from the images stored in the storage unit and corresponding to the video playback timing, an image or images whose rendition coordinates match those in the condition information or are within a predetermined distance from the coordinates in the condition information.

Furthermore, the condition information may include information for specifying playback speed, the playback unit may select one of a plurality of playback speeds, and perform playback in accordance with the selected playback speed, and the predetermined condition relating to the selection by the image selection unit may be a condition that the playback speed selected by the playback unit for the video currently being played matches the playback speed designated by condition information in correspondence with the specified location.

According to the stated structure, since the condition information includes information for specifying the playback speed such as a double speed playback mode, the image selection unit can select images that include, in the condition information, a playback mode corresponding to the playback speed of the video stream being played.

Furthermore, the predetermined codes may be for further designating image identifiers, each image being in correspondence with an image identifier, the program execution unit may further implement the interpreting and execution by storing each designated image identifier in the storage unit in correspondence with the corresponding image, the condition information may include an image identifier, and the image selection unit may select each of the one or more images only when (a) a predetermined relationship is satisfied between the rendition time of the image and the specified location, and, in addition, (b) if the specified location has corresponding condition information, the image identifier stored in correspondence with the image and the image identifier in the condition information match each other.

According to the stated structure, since the predetermined code specifies the image identifier correspond to each image, the image selection unit can select, from among the images stored in the storage unit, one or more images that not only fit the playback timing of the video but whose identifiers match the condition information.

NUMERICAL REFERENCES

Figure 1:
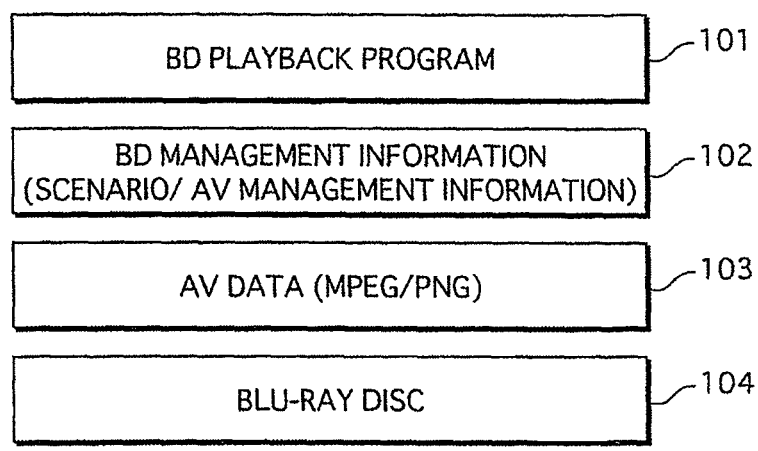
FIG. 1 shows the data hierarchy of a BD-ROM relating to an embodiment of the present invention.

101 BD playback program
102 BD management information
103 AV data
104 BD
201 BD
202 Optical pickup
203 Program recording memory
204 Management information recording memory
205 AV recording memory
206 Program processing unit
207 Management information processing unit
208 Presentation processing unit
209 Image plane
210 Video plane
211 Composition processing unit
301 Program recording memory
302 Program processor
303 UOP manager
304 Management information recording memory
305 Scenario processor
306 Presentation controller
307 Clock
308 Image memory
309 Track buffer
310 Demultiplexer
311 Image processor
312 Video processor
313 Sound processor
314 Image plane
315 Video plane
316 Composition processing unit
317 Drive controller
700 Application
701 User event reception unit
702 Graphics information storage unit
703 Graphics information control unit
704 Graphics information transmission unit
705 Stream event information reception unit
710 Platform
711 Graphics information reception unit
712 Stream event information transmission unit
713 Graphics rendition unit
714 Stream event reception unit
1400 Application
1401 User event reception unit
1402 User event information transmission unit
1403 Graphics information transmission unit
1410 Platform
1411 User event information reception unit
1412 Graphics information reception unit
1413 Graphics information storage unit
1414 Graphics information control unit
1415 Graphics rendition unit
1416 Stream event reception unit
1800 Application
1801 User event reception unit
1802 Graphics information storage unit
1803 Graphics information control unit
1804 Graphics information transmission unit
1805 Stream event information reception unit
1806 Mode-switch event reception unit
1807 Filtering information setting unit
1808 Filtering information transmission unit
1810 Platform
1811 Graphics information reception unit
1812 Stream event information transmission unit
1813 Graphics rendition unit
1814 Stream event reception unit
1815 Filtering information reception unit
1816 Filtering information storage unit

BEST MODE FOR CARRYING OUT THE INVENTION

First Embodiment

The following describes a playback apparatus of the present invention with reference to the drawings.

FIG. 1 shows the structure of a BD-ROM (hereinafter referred to as a BD) that is played in the playback apparatus relating to the present invention, and in particular shows a BD 104 that is a disc medium, and the structure of data 101, 102, and 103 recorded on the BD 104.

The data recorded on the BD 104 is AV data 103, BD management information 102, and a BD playback program 101. The BD management information 102 is management information, AV playback sequence, and the like relating to the AV data.

Note that in the present embodiment the description of the BD focuses on the AV application for playing AV contents such as a movie, but the BD may be used as a recording medium for computer use in the manner of a CD-ROM or a DVD-ROM.

Figure 2:
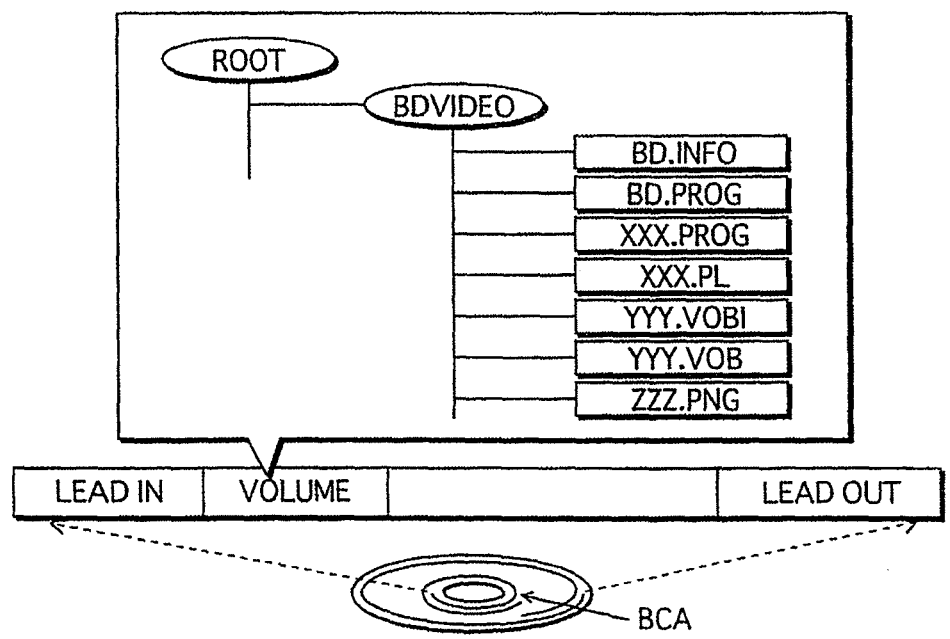
FIG. 2 is a structural drawing of the logical space of the BD-ROM relating to an embodiment of the present invention.

FIG. 2 shows the logical data recorded on the BD 104.

As with DVDs, CDs and the like, the BD 104 has a recording area that spirals from the inner circumference towards the outer circumference, and has a logical address space between a lead in at the inner circumference and a lead out at the outer circumference. In addition, the BD 104 has a special area called a BCA (burst cutting area) on the inner side of the lead in, that only a drive can read. This area is used for copyright protection and the like because it cannot be read from applications.

Recorded in the logical address space is video data and the like with file system information (volume) at the head.

The file system is a UDF, an ISO9660 file system, or the like, and, as with an ordinary personal computer, the logical data can be read following the directory and file structure.

In the present embodiment, the directory and file structure on the BD 104 is such that a BDVIDEO directory is disposed directly below a root directory (ROOT). This BDVIDEO directory is where data 101, 102, and 103 of AV, management information and the like of the BD 104 is recorded.

The following seven files are recorded in the BDVIDEO directory.

<BD.INFO> (fixed filename)

BD.INFO is one file of the BD management information 102, and stores information relating the BD overall. The BD playback apparatus reads this file first.

<BD.PROG> (fixed filename)

BD.PROG is one file of the BD playback program 101, and stores a program relating to the BD overall.

<XXX.PL> (XXX is variable, the extension PL is fixed)

Each XXX.PL is one file of the BD management information 102, and stores playlist information of a scenario. There is one XXX.PL file per playlist.

<XXX.PROG> (XXX is variable, the extension PROG is fixed)

Each XXX.PROG is one file of the BD playback program 101, and stores a program for one playlist. The correspondence between the XXX.PROG files and the playlists is distinguished by the file body name (XXX matches).

<YYY.VOB> (YYY is variable, the extension VOB is fixed)

Each YYY.VOB is one file of the AV data 103, and stores an MPEG stream. There is one YYY.VOB per MPEG stream.

<YYY.VOBI> (YYY is variable, the extension VOBI is fixed)

Each YYY.VOBI is one file of the BD management information 102, and stores management information relating to the corresponding VOB. The correspondence between the YYY.VOBI files and the VOBs is distinguished by the file body name (YYY matches).

<ZZZ.PNG> (ZZZ is variable, the extension PNG is fixed)

Each ZZZ.PNG is part of the AV data 103, and stores data of subtitles or the like in a PNG format (an image format standardized by W3C). Hereinafter this data is referred to as PNG data. There is one ZZZ.PNG file for each set of PNG data.

Figure 3:
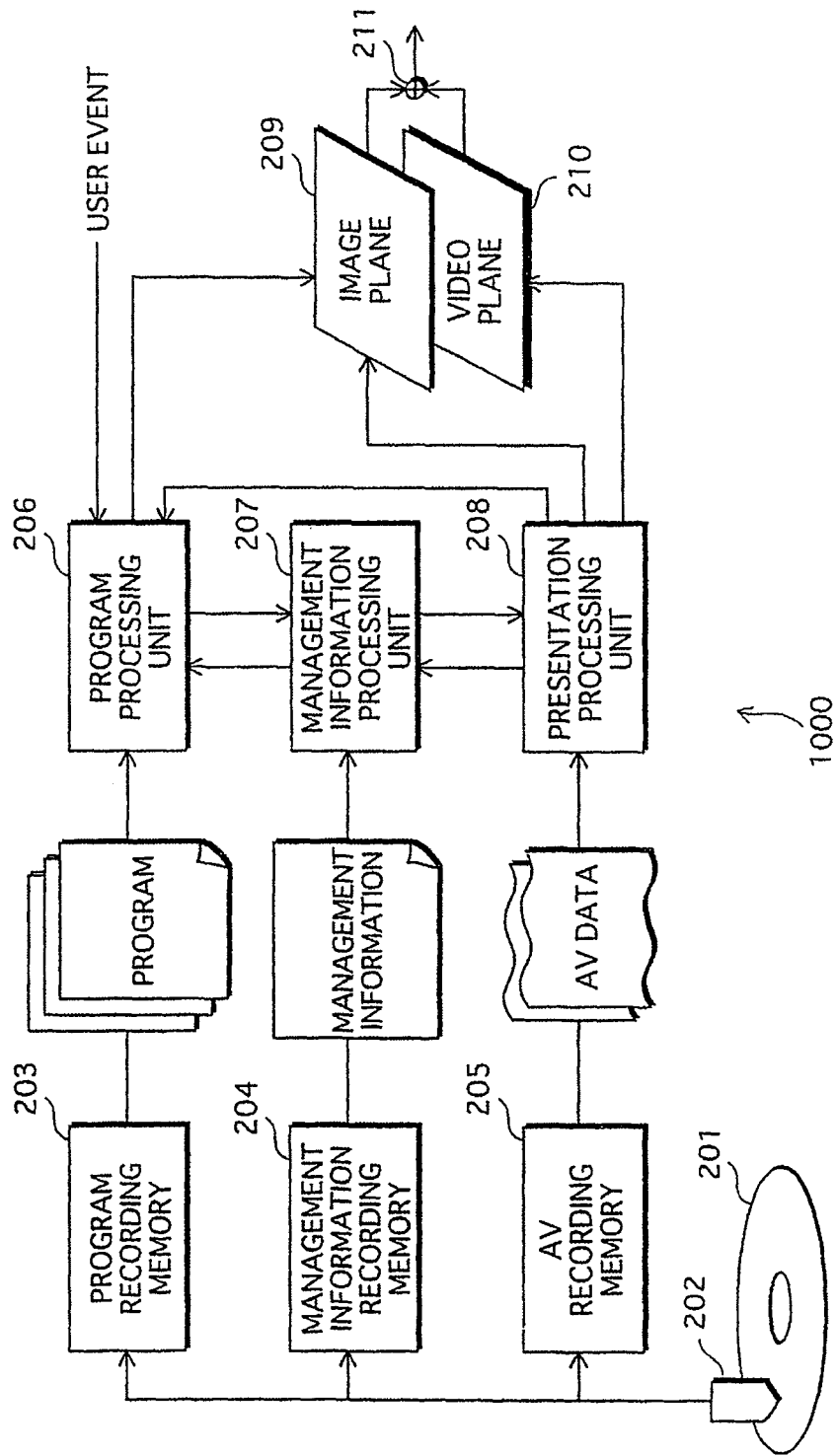
FIG. 3 is a functional structure diagram of a playback apparatus relating to the present invention.
Figure 4:
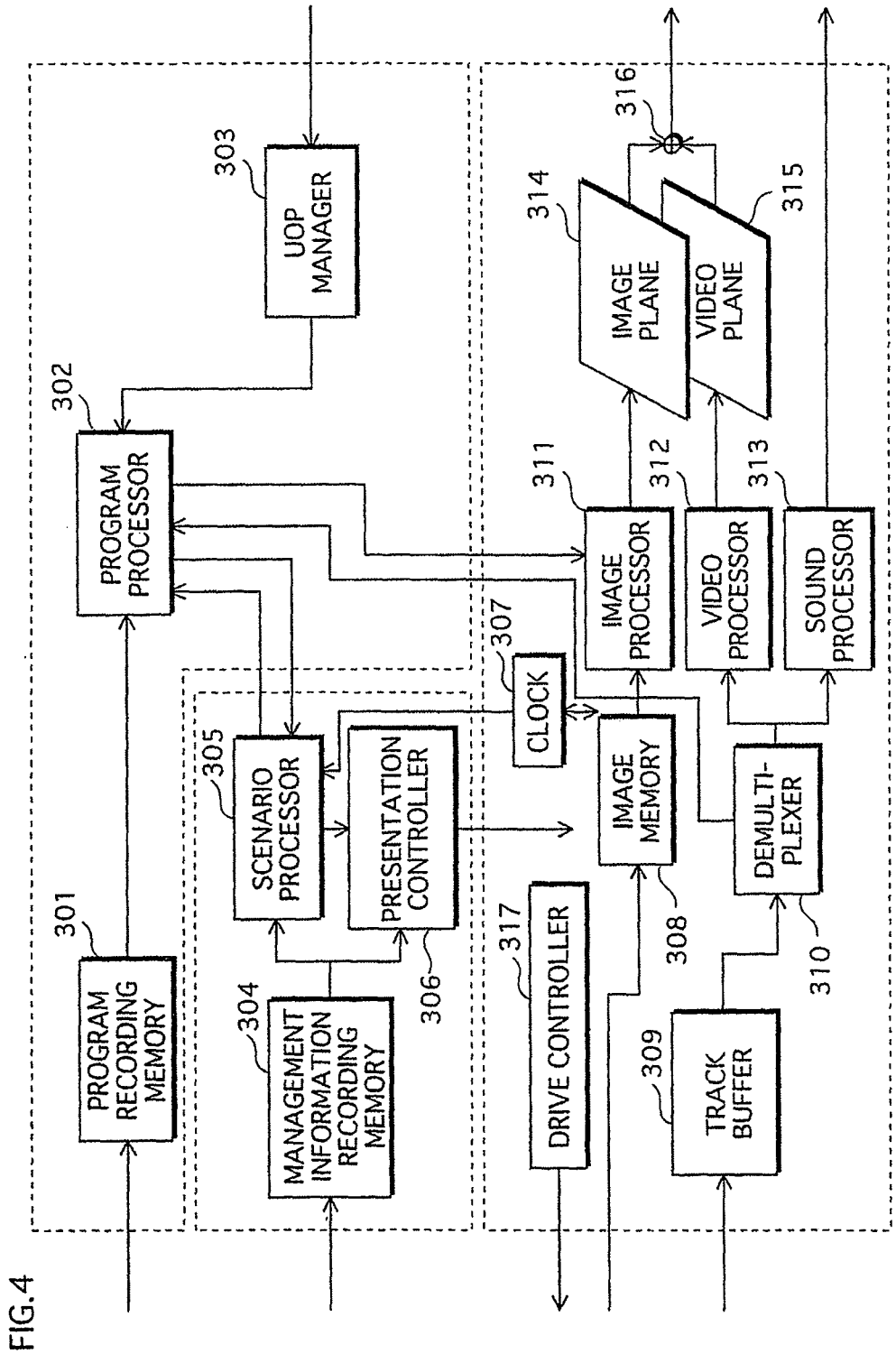
FIG. 4 is a hardware structural diagram of the playback apparatus relating to the present invention.

The following describes the structure of the playback apparatus for playing the BD 104, with reference to FIG. 3 and FIG. 4.

FIG. 3 is a functional block diagram of a playback apparatus 1000.

Data on a BD 201 is read via an optical pickup 202, and the read data is stored in a dedicated memory according to the data type.

The storage locations of the data 101 to 103 on the BD 104 in FIG. 2 are as follows.

The BD playback programs 101 (BD.PROG and XXX.PROG) are recorded in a program recording memory 203, the BD management information 102 (BD.INFO, XXX.PL, and YYY.VOBI) are recorded in a management information recording memory 204, and the AV data 103 (YYY.VOB and ZZZ.PNG) are recorded in an AV recording memory 205.

Program Processing Unit 206

A program processing unit 206 receives, from a management information processing unit 207, information of playlists for playing AV data, and event information for execution of BD playback programs and the like, and processes the BD playback programs. The program processing unit 206 also receives events via a remote control, a joystick, or the like (hereinafter these events are referred to as user events), and, if there is a corresponding BD playback program, executes that BD playback program.

In addition, when a presentation processing unit 208 is playing AV data, if a stream event (described below) exists in the AV data, the program processing unit 206 receives the stream event from the presentation processing unit 208.

Note that the aforementioned BD playback program may be an application for playing AV data other than the AV data being played, or may be an application for rendering graphics.

Although the example given for the present embodiment of the BD playback program is one of an application that renders graphics as necessary superimposed on video simultaneously with playback of AV data, the BD playback program may be either for playing AV data or rendering graphics only. Furthermore, although the present embodiment assumes a Java application as a general-purpose program, a program written in another programming language such as C language is possible.

Management Information Processing Unit 207

The management information processing unit 207 receives an instruction from the program processing unit 206, analyzes management information of the corresponding playlist and VOBs corresponding to the playlist, and instructs the presentation processing unit 208 to play AV data according to the result of the analysis. Furthermore, the management information processing unit 207 receives time information from the presentation processing unit 208, and, based on the time information, instructs the presentation processing unit 208 to stop playback. The management information processing unit 207 also instructs execution of programs to the program processing unit 206.

Presentation Processing Unit 208

The presentation processing unit 208 has decoders that correspond respectively to video, audio, and PNG data, and outputs AV data to the decoders based on time information and instructions for the management information processing unit 207.

Note that the time information is control information for playing AV data in accordance with a predetermined time axis.

Decoded video data is rendered in a video plane 210, decoded PNG data is rendered in an image plane 209, and the resultant data is composited by a composition unit 211 and output to a display device such as a television.

In addition, when playing AV data, if a stream event exists for the AV data, the presentation processing unit 208 transmits the stream event to the program processing unit 206.

FIG. 4 shows an example of the functional structure of the playback apparatus (FIG. 3) being realized by hardware.

The AV recording memory 205 corresponds to an image memory 308 and a track buffer 309, the program processing unit 206 corresponds to a program processor 302 and a UOP manager 303, the management information processing unit 207 corresponds to a scenario processor 305 and a presentation controller 306, and the presentation processing unit 208 corresponds to a clock 307, a demultiplexer 310, an image processor 311, a video processor 312, and a sound processor 313.

The following outlines processing of AV data read from the BD 201.

AV Data 103

Of the AV data 103 read from the BD 201, the MPEG stream data is recorded in the track buffer 309 and the PNG data is recorded in the image memory 308.

Based on the time of the clock 307, the demultiplexer 310 extracts the MPEG stream data from the track buffer 309, transfers the video data to the video processor 312 and the audio data to the sound processor 313.

The video processor 312 and the sound processor 313 are each composed of a decode buffer and a decoder that comply with MPEG system standards. Specifically, video and audio sent from the demultiplexer 310 are temporarily stored in respective decode buffers, and decoded by the respective decoders based on the clock 307.

The following describes processing of the PNG data recorded in the image memory 308.

If the PNG data is for subtitles, the timing with which the PNG data is to be decoded is instructed by the presentation controller 306. The scenario processor 305 receives time information from the clock 307, and instructs the presentation controller 306 to either display or not display the subtitles according to subtitle display times (start and end), such that subtitles are displayed appropriately.

The image processor 311 reads the PNG data instructed by the presentation controller 306 from the image memory 308, decodes the read PNG data, and renders the decoded data on the image plane 314.

If the BD playback program is for rendering menu images or the like, and the PNG data shows menu images or the like is rendered, the program processor 302 instructs decoding timing to the image processor 311. The timing with which the program processor 302 instructs the image processor 311 to decode the PNG data depends on the BD playback program being processed by the program processor 302.

As described with respect to FIG. 3, after being decoded the PNG data and the video data are recorded in the image plane 314 and the video plane 315, respectively, and composited and output by a composition unit 316.

BD Management Information

BD management information (scenario and AV management information) read from the BD 201 is recorded in a management information recording memory 304.

The scenario information (BD.INFO and XXX.PL) is read and processed by the scenario processor 305, and the AV management information (YYY.VOBI) is read and processed by the presentation controller 306.

The scenario processor 305 analyzes the playlist information, and instructs the presentation controller 306 of MPEG stream data referenced by the playlist and the playback location of the MPEG stream data. The presentation controller 306 analyzes the management information (YYY.VOBI) of the corresponding MPEG stream data, and instructs the drive controller 317 to read the MPEG stream data.

Based on the instruction from the presentation controller 306, the drive controller 317 moves the optical pickup to read the corresponding MPEG stream data.

The scenario processor 305 monitors the time on the clock 307, and sends events to the program processor 302 based on the settings of the management information.

BD Playback Programs

The BD playback programs (BD.PROG and XXX.PROG) recorded in the program recording memory 301 are executed by the program processor 302. The program processor 302 executes the BD playback programs when events are sent from the scenario processor 305 and when events are sent from the UOP manager 303.

On receiving a request according to a remote control operation by the user, the UOP manager 303 generates event information showing the request, and transfers the event information to the program processor 302.

Figure 5:
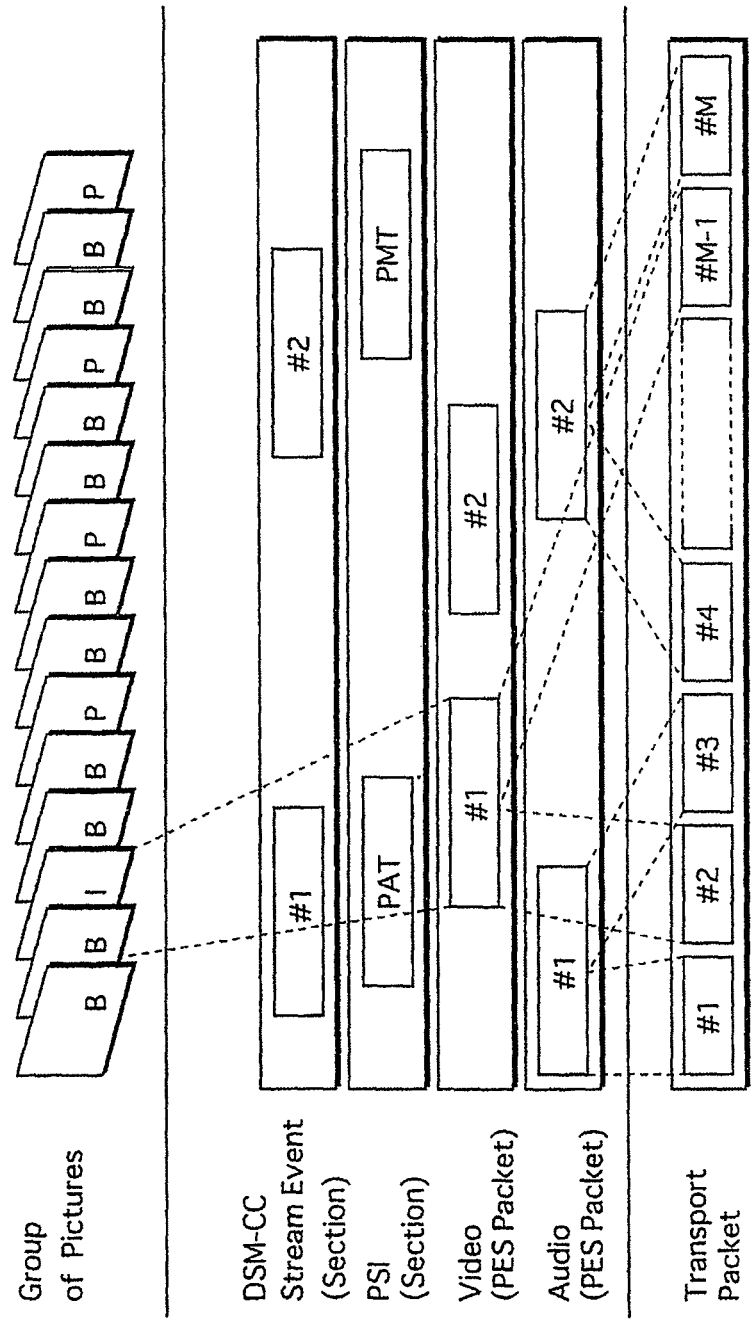
FIG. 5 is a structural diagram of an MPEG stream relating to an embodiment of the present invention.

FIG. 5 is a structural drawing of an MPEG stream in the present embodiment.

The MPEG stream is composed of a plurality of transport packets (hereinafter referred to as TS packets), each of which is 188 bytes in size.

A video stream (Video), an audio stream (Audio) and the like are each divided into a plurality of TS packets, and are sent in a multiplexed state.

The video stream, the audio stream and the like are also each composed of a plurality of PES packets. In addition to streams composed of PES packets, information that is sent in TS packets includes PSI (program specific information) and stream events (DSM-CC stream event) which are sent according to sections (Section).

As one example, in a case in which particular AV data is to be played, PSI provides information such as which PES packets are to be decoded from the video stream and the audio stream.

A stream event provides information to an application that operates in coordination with AV data at a particular time.

Figure 6:
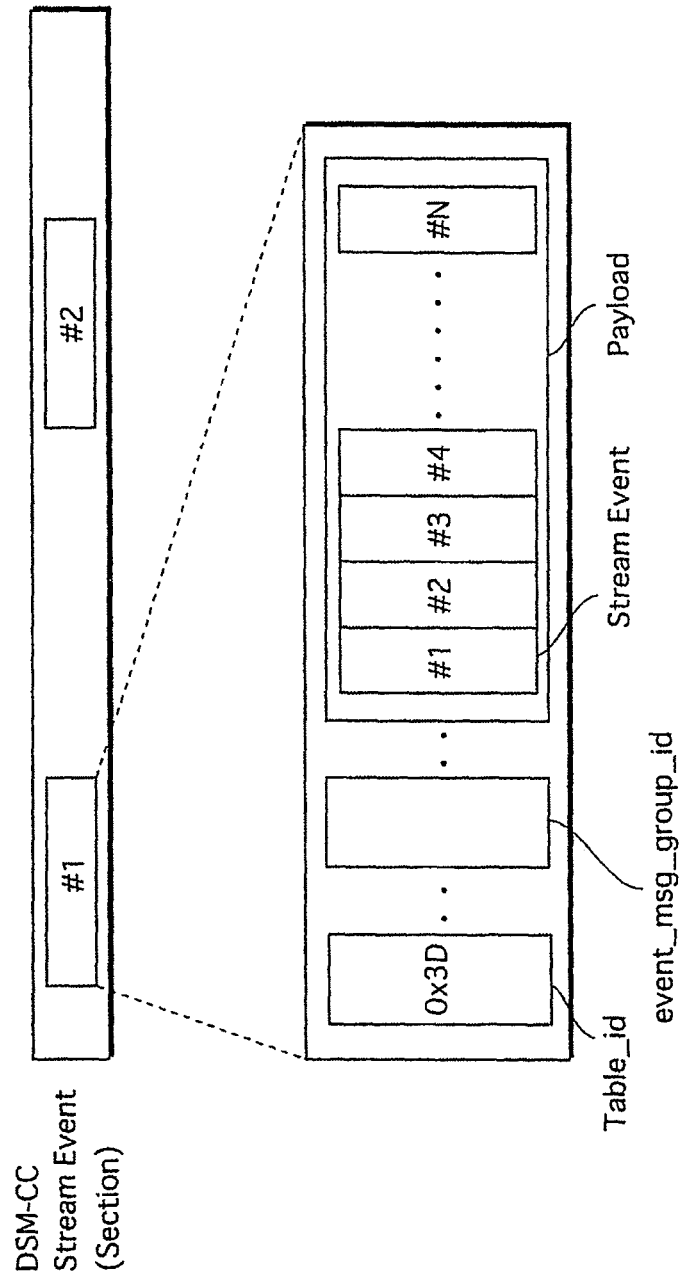
FIG. 6 is a structural diagram of a section that conveys a stream event in an embodiment of the present invention.

FIG. 6 is a structural drawing of a section (Section) that transfers a stream event (DSM-CC Stream Event).

Each section that transfers the stream event is composed of a table_id, an event_msg_group_id, a payload (Payload), and the like.

The table_id shows what type of data is stored in the payload, the payload being a data storage area. In the case of the payload storing a stream event, the table_id has a value 0x3D.

The event_msg_group is a common name for identifying a stream event group stored in the payload. Stream events are transmitted stored in a payload.

Further details of this structure can be found in MPEG system (ISO/IEC13818-1) and DSM-CC (ISO/IEC13818-6), and are therefore omitted here.

Outline of Processing

Figure 14:
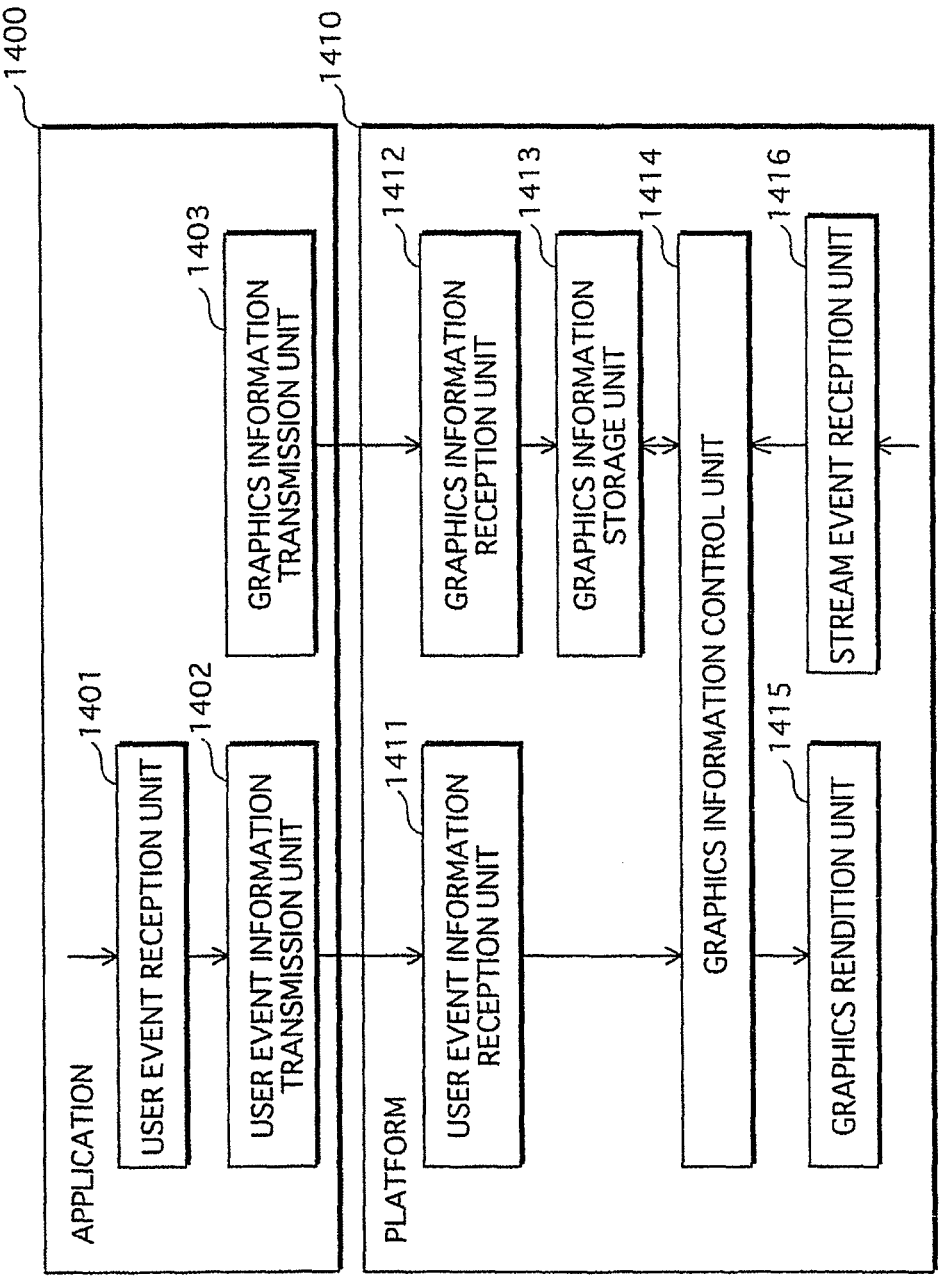
FIG. 14 is a functional structure diagram of an application and a platform relating to a first embodiment.

FIG. 14 is a functional block diagram of the program (BD playback program) and the program processing unit 206 in the present embodiment.

In FIG. 14, an application 1400 corresponds to the program, and a platform 1410 corresponds to the program processing unit 206 that is the program execution environment.

In the present embodiment, the application 1400 is a Java application. The platform 1410 is a virtual machine that includes a processor, and that successively interprets and converts the Java application program into machine language instructions that are executable by the processor, which the processor then executes.

The application 1400 is an application for rendering graphics over part or all of images of AV data being played. The application 1400 renders the graphics based on graphics information that includes information such as a rendition time and rendition coordinates. One specific example of this kind of application is a shooting game that uses AV data images for the background.

The platform 1410 selects graphics information indicating graphics to be rendered, based on the graphics information and stream event information showing a stream event pre-embedded in the MPEG stream. The platform 1410 instructs the image plane 209 to render graphics based on the selected graphics information.

In other words, the processing of the platform 1410 is implemented by the processor processing machine language instruction sets to the effect of instructing selecting of graphics to be rendered and rendering the selected graphics.

The following describes the functional structure of the application 1400 and the platform 1410.

Application 1400

The application 1400 is composed of a user event reception unit 1401, a user event information transmission unit 1402, and a graphics information transmission unit 1403, each unit showing operations in the application 1400.

Note that each of the units consists of an interface (hereinafter called an API function) for the platform to receive input, from the application, of program code description parts that compose the application.

The application 1400 is able to output user event information, graphics information, and the like to the platform 1410 by calling the appropriate API function.

In other words, of the program code description parts that compose the application, execution of the part that describes an instruction for calling an API function for transmitting user event information corresponds to the user event information transmission unit 1402. Furthermore, execution of the part that describes an instruction for calling an API function for transmitting graphics information corresponds to the graphics information transmission unit 1403.

The user event reception unit 1401 receives a user event from the program processing unit 206, and extracts user event information such as the user event type and coordinates.

The user event information transmission unit 1402 transmits the extracted user event information to the platform 1410.

The graphics information transmission unit 1403 transmits predetermined graphics information to the platform 1410.

Here, transmission of graphics information refers to calling an API function in which the argument is referencing of the graphics information in the application 1400.

Note that in reality, calling of the API function is implemented by interpreting by the platform 1410.

Platform

The platform 1410 is composed of a user event information reception unit 1411, a graphics information reception unit 1412, a graphics information storage unit 1413, a graphics information control unit 1414, a graphics rendition unit 1415, and a stream event reception unit 1416.

The user event information reception unit 1411 receives user event information from the application 1400.

The graphics information reception unit 1412 receives predetermined graphics information from the application 1400.

Here, receiving graphics information from the application 1400 specifically denotes the processor executing machine language instructions to the effect of the platform 1410 interpreting an API function in which the argument is referencing of the graphics information in the application 1400, and storing the graphics information in the graphics information storage unit 1413. As a result, the graphics information is stored in the graphics information storage unit 1413.

The graphics information storage unit 1413 is a memory in the logical space in the platform 1410, and stores graphics information.

The graphics information control unit 1414 selects graphics information to be rendered, based on the graphics information stored in the graphics information storage unit 1413 and the stream event information received from the stream event reception unit 1416.

The graphics rendition unit 1415 instructs the image plane 209 to render graphics based on the graphics information.

The stream event reception unit 1416 receives a stream event pre-embedded in the AV data from the presentation processing unit 208, and extracts the stream event information.

Data

Graphics Information

Figure 8:
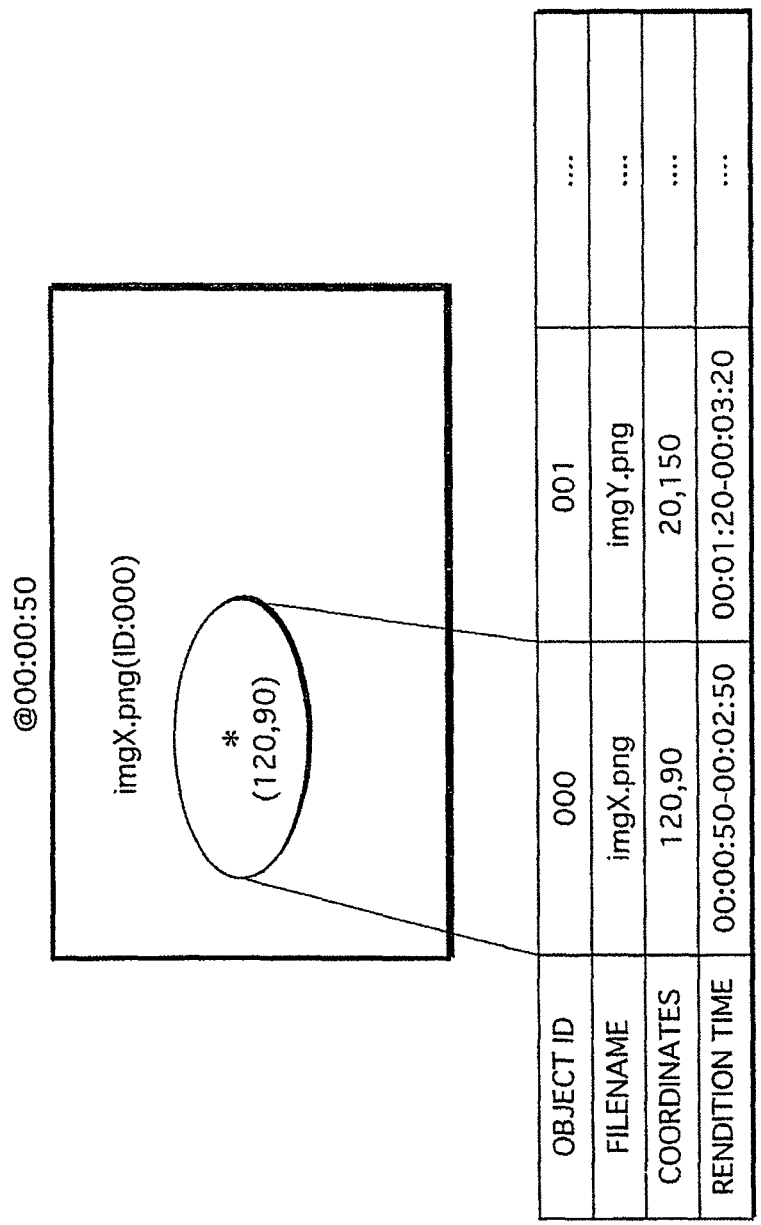
FIG. 8 shows an example of graphics information relating to the present invention.

FIG. 8 shows an example of graphics information relating to the present embodiment.

In FIG. 8, each piece of the graphics information is composed of an object ID, a filename, a set of coordinates, and a set of rendition times.

The object ID is a name for identifying a graphics object, and is unique in the application.

The filename shows the file that stores PNG data corresponding to the graphics object.

The set of coordinates is a rendition location that is used as a reference when selecting a graphics object to be rendered. Take for example a case in which a set of coordinates is designated by the user. Here, if another set of coordinates in another piece of graphics information falls within a range whose center point is the designated set of coordinates and that extends a set distance from the center point, the graphics object corresponding to the other set of coordinates is rendered in the location indicated by the designated set of coordinates.

The set of rendition times consists of a time to start rendition of the graphics object and a time to end rendition of the graphics object. These times are designated as locations on the playback time axis of the AV data that is played together with execution of the application.

Stream Event Information

Figure 9:
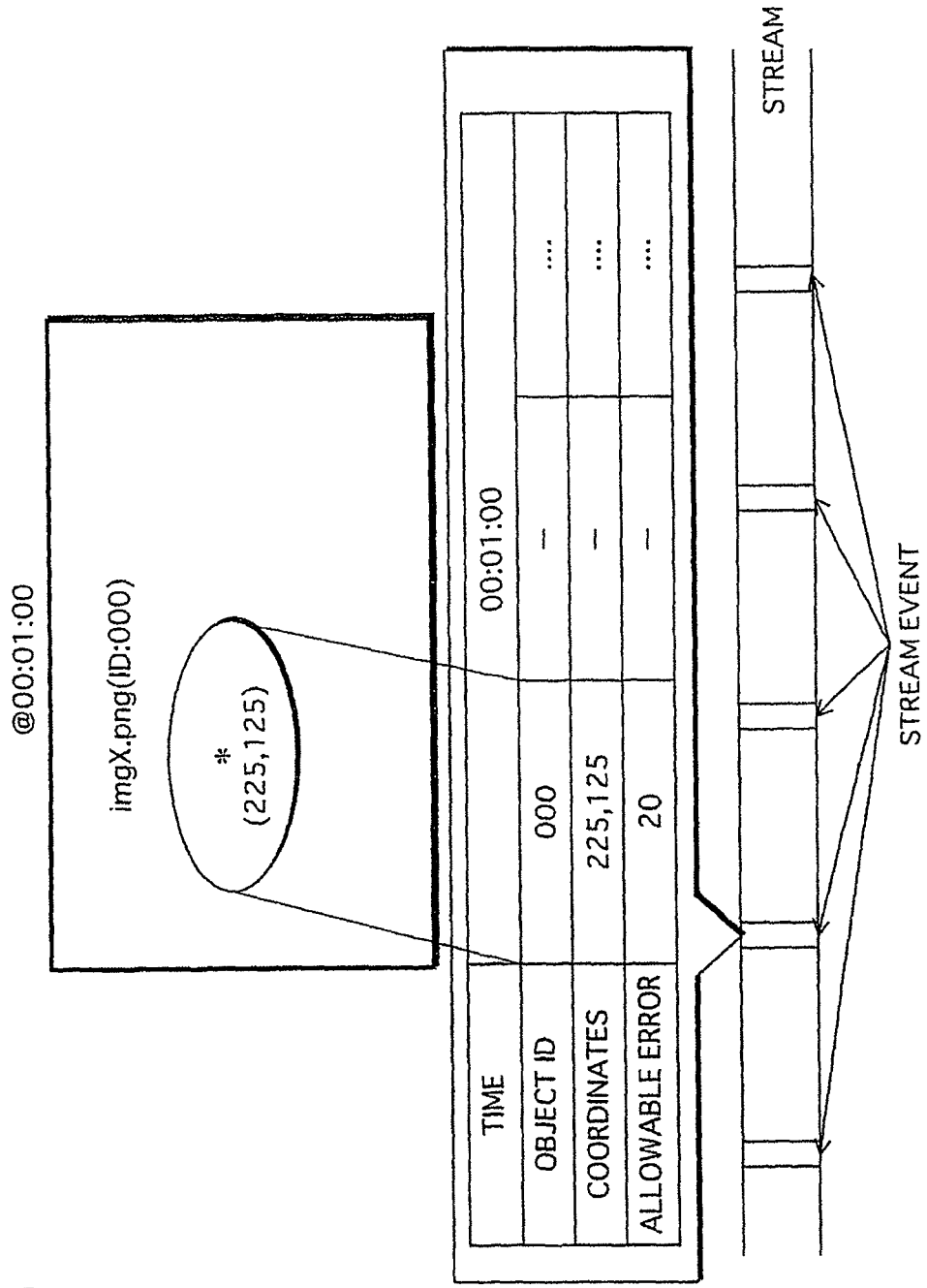
FIG. 9 shows an example of stream event information relating to the present invention.

FIG. 9 shows an example of stream event information in the present embodiment.

The stream event information is composed of a time, an object ID, a set of coordinates, and an acceptable error.

The time is a location on the playback time axis of AV data in which the stream event was embedded.

The object ID is a name for identifying a corresponding graphics object.

The set of coordinates shows where a corresponding graphics object is to be rendered.

The acceptable error is a range of coordinates for a graphics object to be rendered, and is used to select a graphics object to be rendered corresponding to the stream event. More specifically, if the set of coordinates in a piece of graphics information falls in a range of the value of the acceptable error from the center of the location of coordinates at which rendition is to take place, the graphics object corresponding to the set of coordinates is selected for rendering.

The example of the stream information in FIG. 9 shows that in a case in which the time in the AV data is "1 minute", and the graphics object whose object ID "000" in the graphics information (FIG. 8) is the rendition target, the graphics object corresponding to the object ID "000" will be rendered at the coordinates "(225,125)".

Operations

Figure 15:
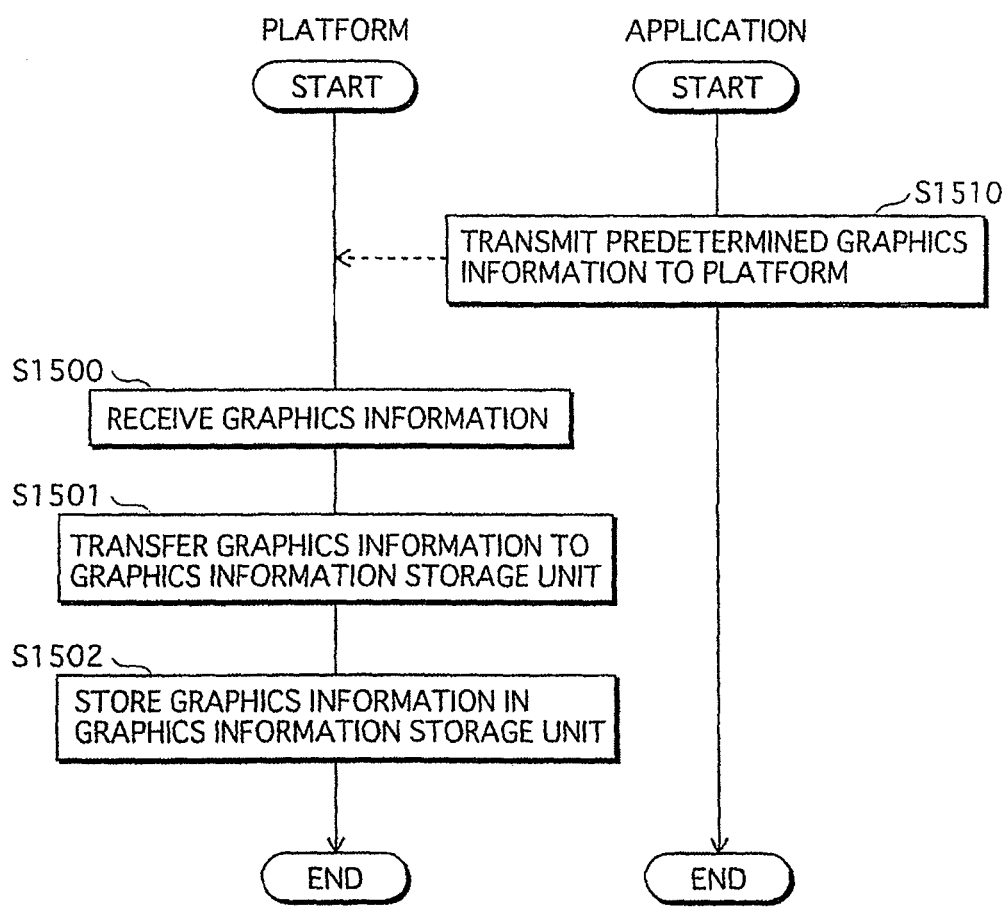
FIG. 15 is a flowchart showing processing for transmission/reception of graphics information between the application and the platform relating to the first embodiment.

FIG. 15 is a flowchart showing transmission of graphics information to the platform 1410 when the application 1400 is initiated.

The following describes processing when the playback apparatus 1000 is activated by a user operation and the platform 1410 executes the application 1400.

The graphics information transmission unit 1403 of the application 1400 transmits graphics information to the platform 1410 (S110).

The graphics information reception unit 1412 of the platform 1410 receives the graphics information transmitted at step S1510 (S1500).

The graphics information reception unit 1412 transfers the graphics information received at step S1500 to the graphics information storage unit 1413 (step S1501), and the graphics information storage unit stores the graphics information (S1502).

Figure 16:
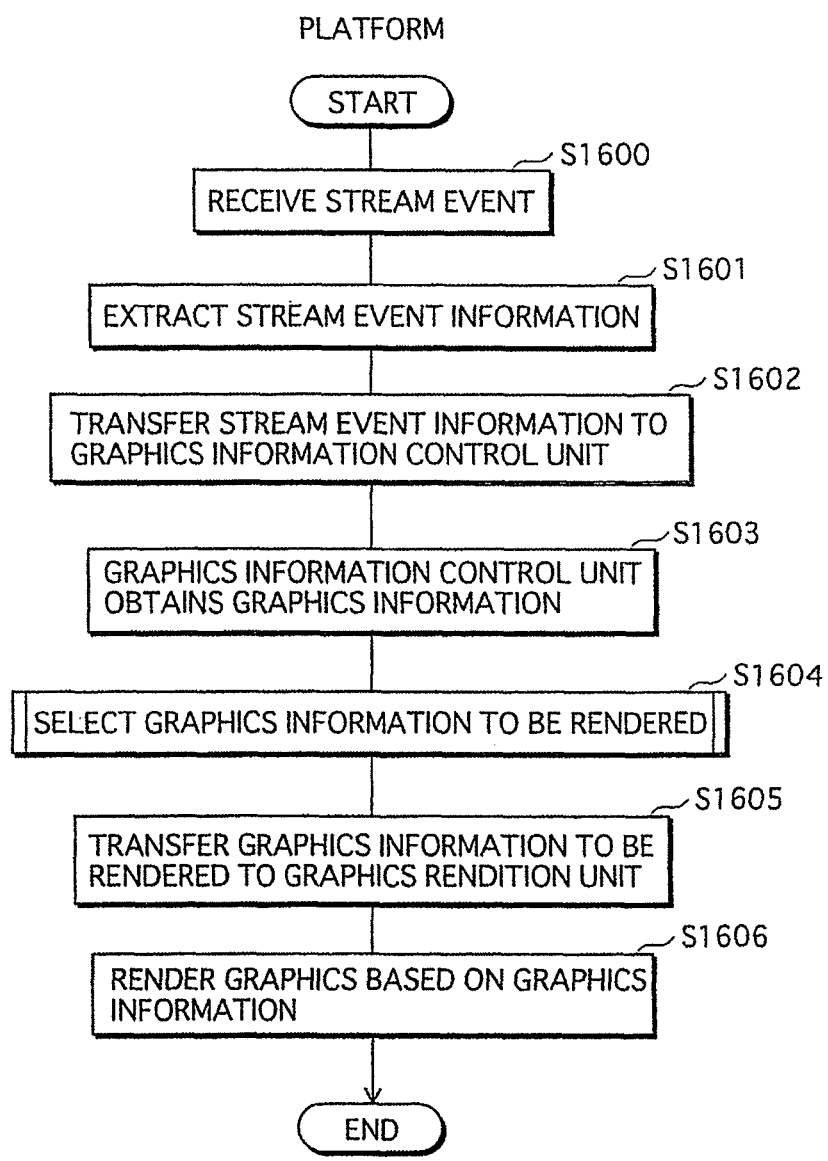
FIG. 16 is a flowchart showing processing for controlling graphics rendition when a stream event occurs in the first embodiment.

FIG. 16 is a flowchart showing control of graphics rendition in response to stream event information embedded in advance in the AV data.

Specifically, a graphics object is rendered as a result of corresponding stream event information occurring in response to the AV data playback time.

Note that it is assumed that the graphics information is already stored in the graphics information storage unit 1413 of the platform 1410 when the application is initiated, and that a stream event is included in the AV data that is played.

Referring to FIG. 16, the following describes processing in the platform 1410 in the case of the program processing unit 206 receiving a stream event from the presentation processing unit 208.

The stream event reception unit 1416 receives the stream event from the presentation processing unit 208 (S1600), extracts the stream event information from the received stream event (S1601), and transfers the stream event information to the graphics information control unit 1414 (S1602).

The graphics information control unit 1414 reads the graphics information from the graphics information storage unit 1413 (S1603).

Next, the graphics information control unit 1414 selects, from among all the graphics information read at step S1603, any graphics information (either one or a plurality of pieces of graphics information) that corresponds to the stream event information extracted at step S1601 (S1604), and transfers the selected graphics information to the graphics rendition unit 1415 (S1605).

Based on the transferred graphics information, the graphics rendition unit 1415 instructs the image plane 209 to render the graphics (S1606).

Selection Processing (Stream Event)

Figure 11:
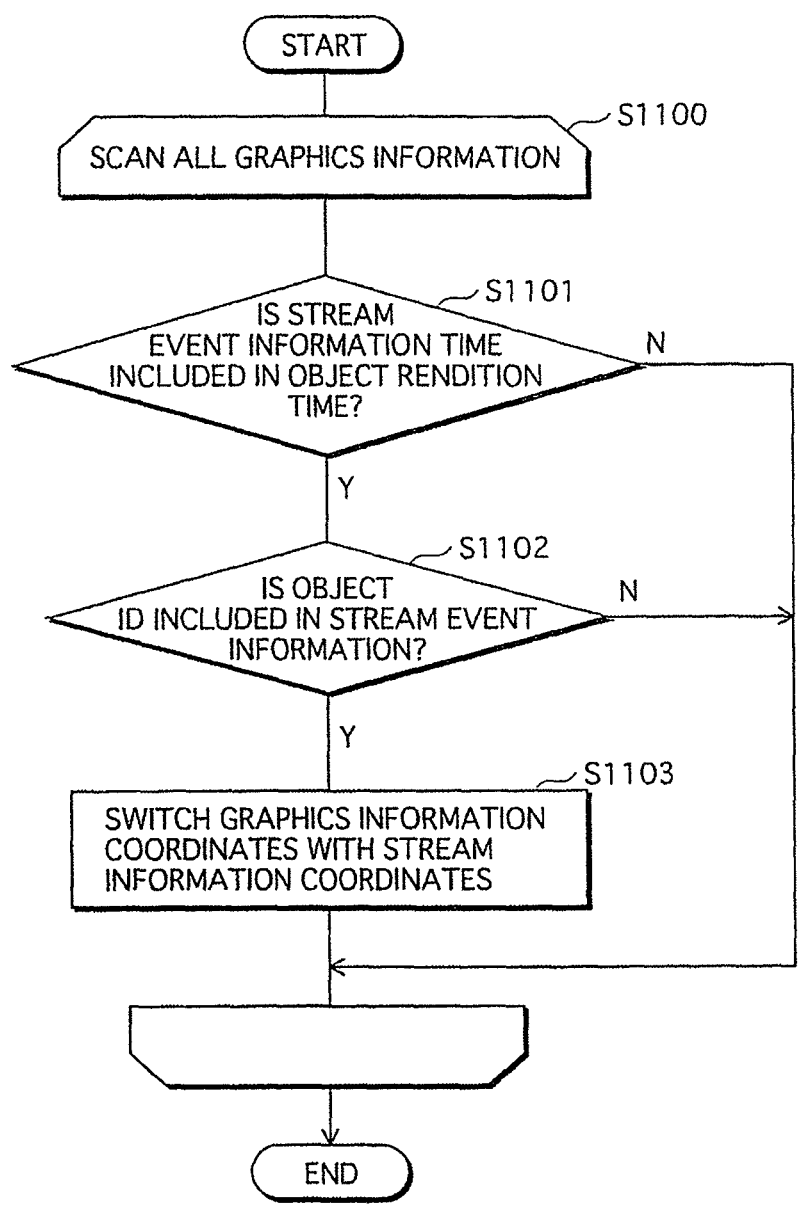
FIG. 11 is a flowchart showing graphics information selection processing based on stream event information.

Referring to FIG. 11, the following describes processing for selecting graphics information (either one or a plurality of pieces) when a stream event occurs.

At step S1100, the graphics information control unit 1414 performs selection processing by scanning all of the graphics information in the graphics information storage unit 1413.

The graphics information control unit 1414 selects any graphics information whose rendition time encompasses the time (hereinafter referred to as an event time) included in the stream event information extracted from the stream event received from the stream event information reception unit 1416 (S1101).

When having selected a graphics information whose rendition time encompasses the event time (S1101: Y), the graphics information control unit 1414 then selects, from among the graphics information selected at step S1101, graphics information whose corresponding graphics object has an object ID that matches the object ID included in the stream event information (S1102).

When having selected at step S1102 graphics information whose object ID matches (S1102: Y), the graphics information control unit 1414 replaces the coordinates of the selected graphics information with the coordinates of the stream information (S1103).

This graphics information is transferred to the graphics rendition unit 1415, and the graphics rendition unit 1415 renders the graphics shown by graphics information in the image plane 209. Furthermore, the composition processing unit 211 superimposes the graphics of the image plane 209 and the video data of the video plane 210, and outputs the resultant data.

In this way, by transferring predetermined graphics information to the platform 1410 at the time of the application being initiated, the platform 1410 can control graphics objects to be rendered, without successively transmitting stream event information to the application 1400, and the platform 1410 can perform graphics object selection processing by executing machine language instruction sets.

Note that, for example, when the application transmits the graphics information to the platform, the platform may write, to the AV recording memory 205, the PNG data in the BD shown by the graphics information, and the presentation processing unit 208 may decode the PNG data written to the AV recording memory 205.

Furthermore, in this example, although the graphics to be rendered are selected according to the event time being included in the rendition time and the respective object IDs in the stream event information and the graphics information matching, graphics to be rendered may be selected in the following alternative ways. Graphics to be rendered may be selected according to the event time being included in the rendition time and the coordinates being included in the allowable error range of the coordinates in the stream event information, or according to the event time being included in the rendition time.

User Event

The following describes processing for rendering a graphics object or objects in coordination with AV data that is being played when a user event occurs.

Figure 17:
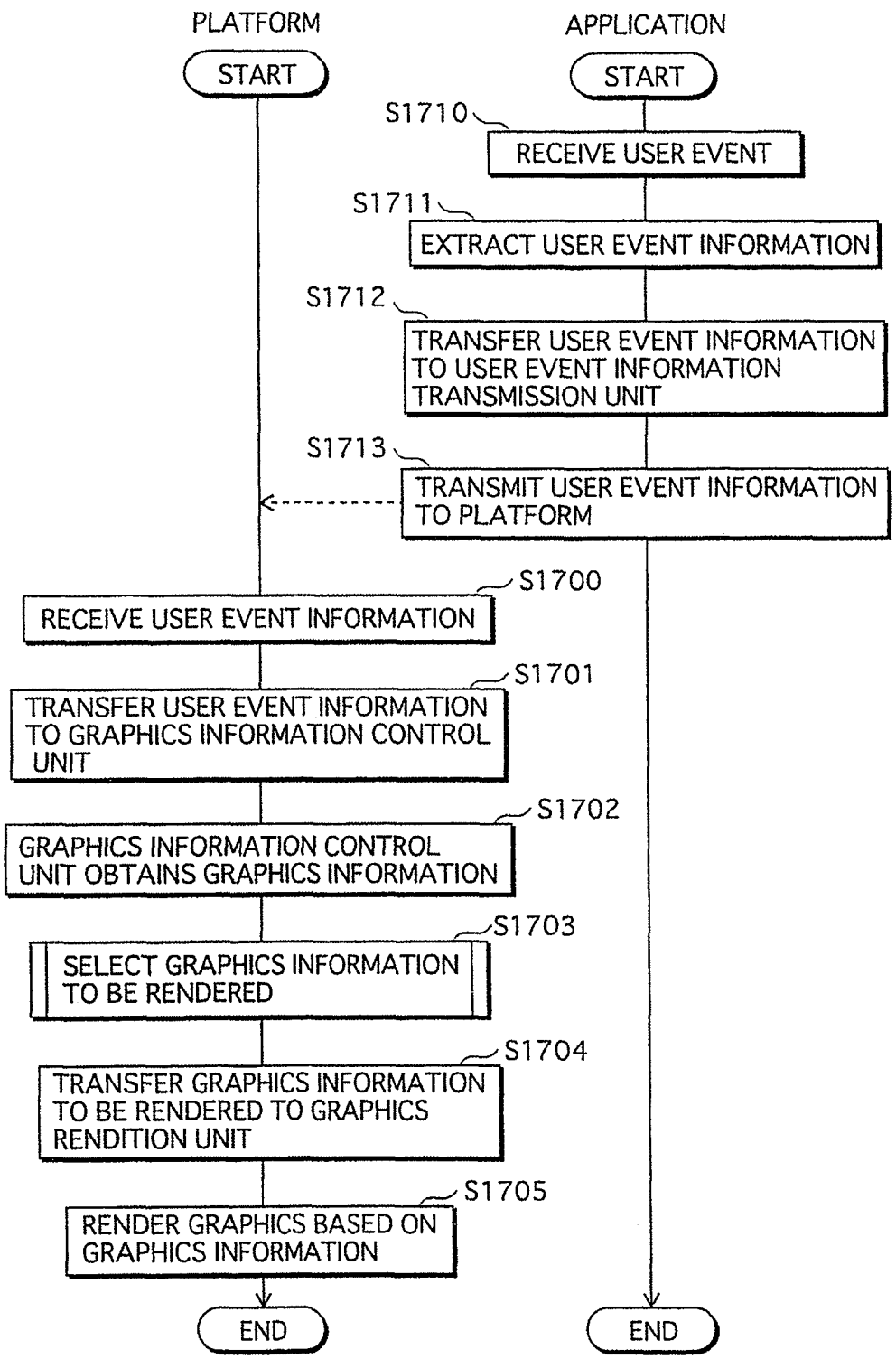
FIG. 17 is a flowchart showing processing for controlling graphics rendition when a user event occurs in the first embodiment.

FIG. 17 is a flowchart showing processing for controlling graphics rendition when the application 1400 receives a user event from the program processing unit 206.

specifically, a graphics object or objects that have coordinates that fall within a predetermined allowable range from the coordinates designated by the user event are rendered.

At step S1710, the program processing unit 206 receives a user event, transfers the user event to the user event reception unit 1401 of the application 1400, and the user event reception unit 1401 receives the user event.

Based on the received user event, the user event reception unit 1401 extracts the coordinates and the like from the user event information (S1711), and transfers the user event information to the user event information transmission unit (S1712).

The user event information transmission unit 1402 transmits the user event information to the platform 1410 (S1713).

The user event information reception unit 1411 of the platform 1410 receives the user event information (S1700), and transfers the user event information to the graphics information control unit 1414 (S1701).

The graphics information control unit 1414 reads the graphics information from the graphics information storage unit 1413 (S1702), and, based on the read graphics information and the user event information, selects a graphics information (either one or a plurality of pieces) of the graphics to be rendered (S1703).

The graphics information control unit 1414 transfers the graphics information selected at step S1703 to the graphics rendering unit 1415 (S1704).

The graphics rendition unit 1415 instructs the image plane 209 to render graphics based on the received graphics information (S1705).

Selection Processing (User Event)

Figure 13:
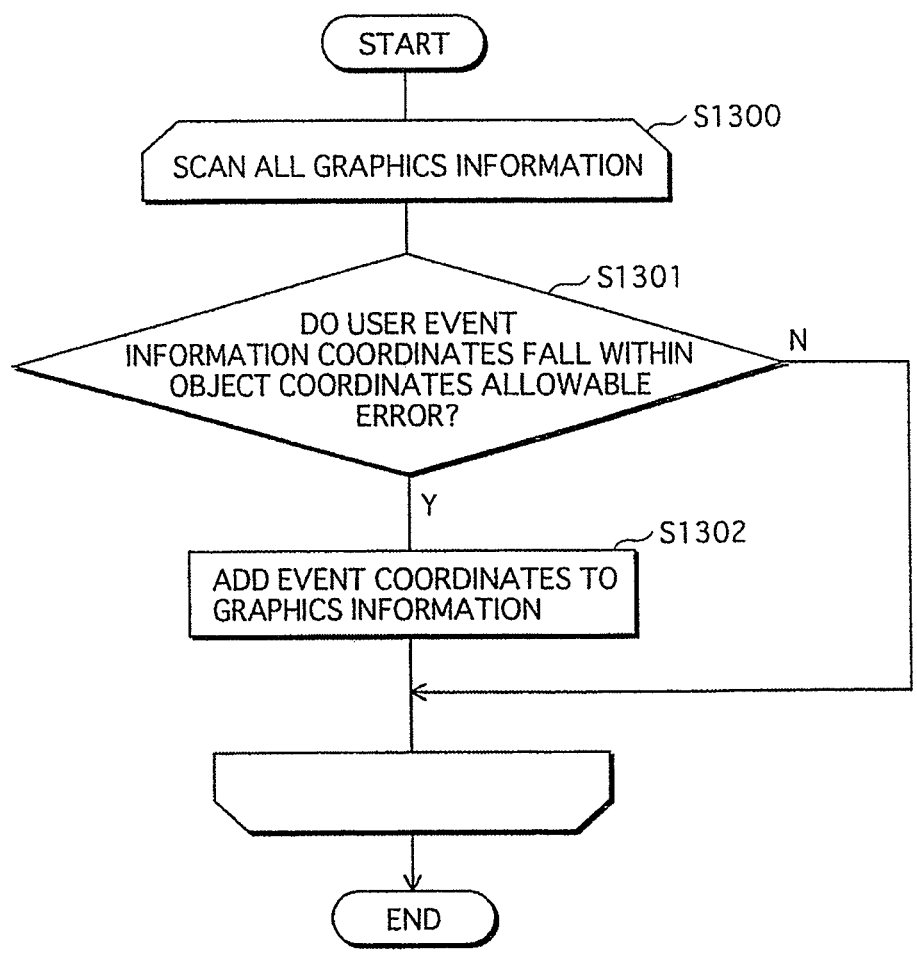
FIG. 13 is a flowchart showing graphics information selection processing based on user event information.

With reference to FIG. 13, the following describes processing for selecting graphics information (either one or a plurality of pieces) when a user event occurs.

At step S1300, the graphics information control unit 1414 scans all the graphics information in the graphics information storage unit 1413.

The graphics information control unit 1414 selects any graphics information that has coordinates that are included in a circle whose center is the coordinates in the received user event information (hereinafter the coordinates in user event information are referred to as event coordinates) and whose radius has a value of the predetermined allowable error (S1301).

When the graphics information control unit 1414 has selected graphics information that has coordinates within the allowable error range of the event coordinates at step S1301 (step S1301: Y), the graphics information control unit 1414 adds the event coordinates to the selected graphics information (S1302).

Second Embodiment

In contrast to the described first embodiment in which the processing for selecting graphics to be rendered was performed by the platform in the present embodiment, the processing for selecting graphics to be rendered is performed by the application in the playback apparatus 1000 (FIG. 3) which has the same structure as in the first embodiment.

Note that the BD-ROM data hierarchy, the BD-ROM logical space structure, the outline of the BD-ROM playback apparatus, the structure of the BD-ROM playback apparatus, the structure of the MPEG stream, and the structure of the sections that convey stream events are the same as in the first embodiment.

Figure 7:
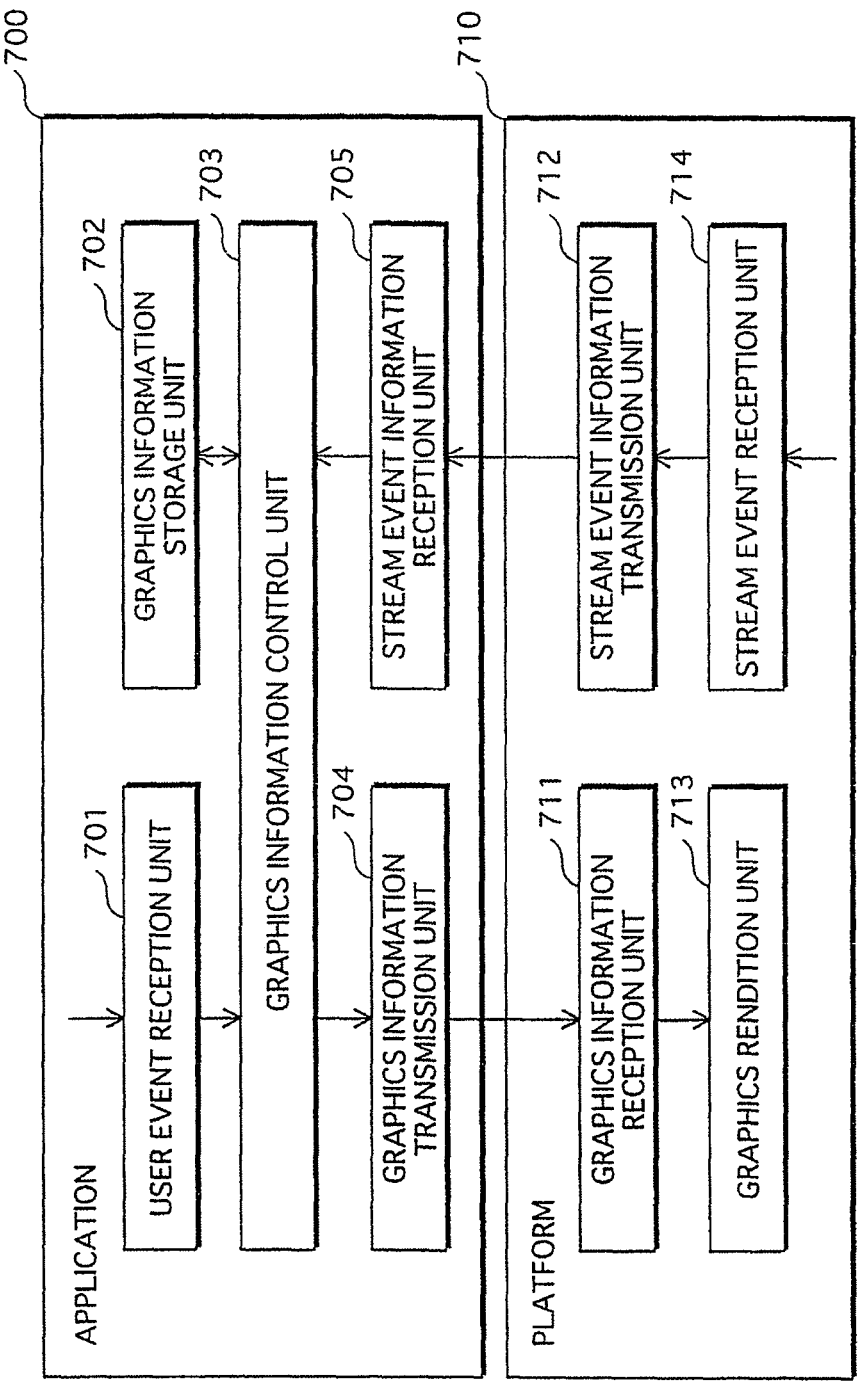
FIG. 7 is a functional structure diagram of an application and a platform relating to a second embodiment of the present invention.

FIG. 7 shows the functional structure of an application 700 and a platform 710 relating to the present embodiment.

Structure of Application 700

Referring to FIG. 7, the application 700 is composed of a user event reception unit 701, a graphics information storage unit 702, graphics information control unit 703, a graphics information transmission unit 704, and a stream event information reception unit 705.

The following describes structure that differs from the first embodiment.

The stream event information reception unit 705 receives stream event information from the platform 710.

The graphics information transmission unit 704 transmits the graphics information selected by the graphics information control unit 705 to the platform 700.

Structure of Platform 710

The platform 710 is composed of a graphics information reception unit 711, a stream event information transmission unit 712, a graphics rendition unit 713, and a stream event reception unit 714.

The stream event information transmission unit 712 transmits the stream event information to the application 700.

The graphics information reception unit 711 successively receives pieces of graphics information corresponding to the application 700 calling API functions for transmitting graphics information.

Operations

Figure 10:
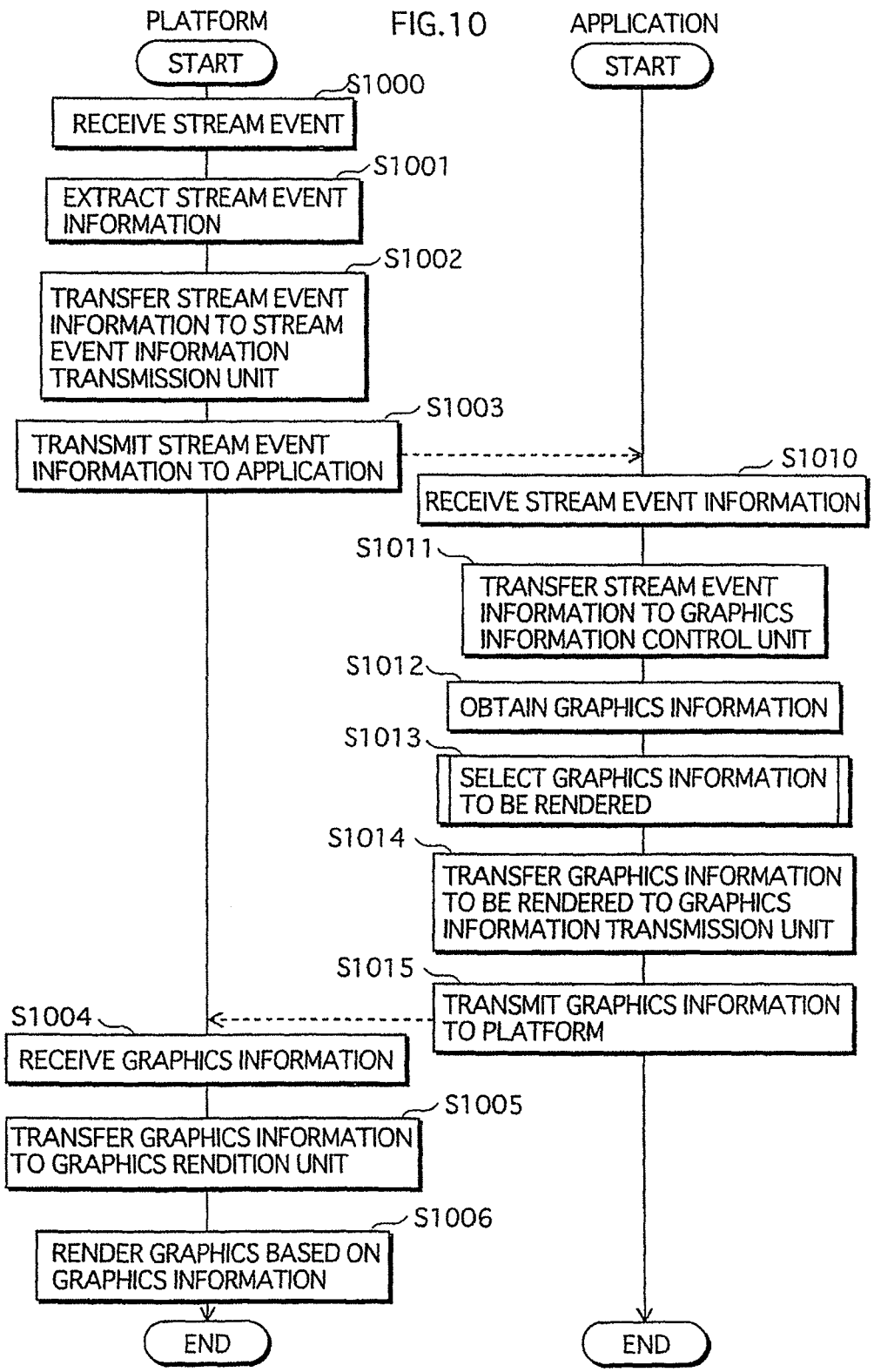
FIG. 10 is a flowchart showing processing for controlling graphics rendition when a stream event occurs in the second embodiment.

FIG. 10 is a flowchart showing processing for controlling graphics rendition in response to stream event information embedded in advance in AV data.

The processing at step S1000 and S1001 in FIG. 10 is the same as in the first embodiment, and therefore a description is given of the processing from step S1002 onwards.

At step S1002, the stream event reception unit 714 transfers stream event information to the stream event information transmission unit 712.

The stream event information transmission unit 712 transmits the stream event information to the application 700 (S1003).

The stream event information reception unit 705 of the application 700 receives the stream event information (S1010), and transfers the stream event information to the graphics information control unit 703 (S1011).

The graphics information control unit 703 reads the graphics information stored in the graphics information storage unit 702 (step S1012), and selects graphics information (either one or a plurality of pieces) based on the read graphics information and the stream event information (S1013).

The graphics information control unit 703 transfers the selected graphics information to the graphics information transmission unit 712 (S1014), and the graphics information transmission unit 712 transmits the transferred graphics information to the platform 710 (step S1015).

The graphics information reception unit 711 of the platform 710 receives the graphics information from the platform 710 (S1004), and transfers the received graphics information to the graphics rendition unit 713 (S1005).

Note that the graphics information selection processing the same as in the first embodiment, and therefore a description thereof is omitted here.

Next, operations for when a user event occurs are described. The following description focuses on those operations that differ from the first embodiment.

Figure 12:
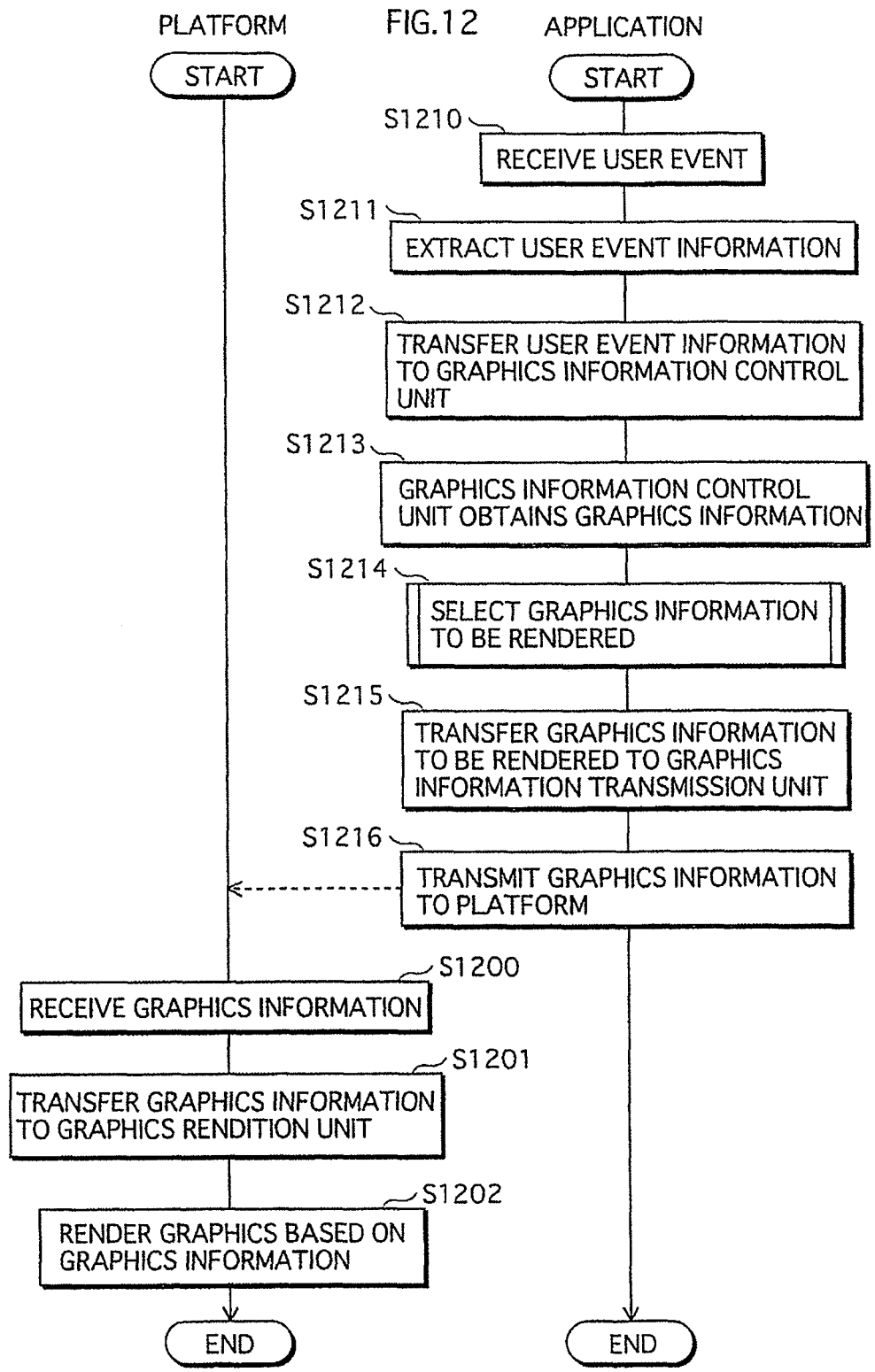
FIG. 12 is a flowchart showing processing for controlling graphics rendition when a user event occurs in the second embodiment.

FIG. 12 is a flowchart showing processing for controlling graphics object rendition when a user event occurs in the present embodiment.

The processing at step S1210 and S1211 in FIG. 12 is the same as in the first embodiment, and therefore a description is given of the processing from step S1212 onwards.

At step S1212, the user event reception unit 701 transfers the user event information to the graphics information control unit 703 of the application 700, and the graphics information control unit 703 receives the user event information (S1213).

The graphics information control unit 703 selects graphics information (either one or a plurality of pieces) based on the graphics information and the user event information (S1214), and transfers the selected graphics information to the graphics information transmission unit 704 (S1215).

The graphics information transmission unit 704 transmits the transferred graphics information to the platform 710 (S1216), and the graphics information reception unit 711 of the platform 710 receives the transmitted graphics information (S1200).

Note that the graphics information selection processing the same as in the first embodiment, and therefore a description thereof is omitted here.

Third Embodiment

The present embodiment is for controlling graphics rendition when the user changes the playback speed in the second embodiment.

Note that the BD-ROM data hierarchy, the BD-ROM logical space structure, the outline of the BD-ROM playback apparatus, the structure of the BD-ROM playback apparatus, the structure of the MPEG stream, and the structure of the sections that convey stream events are the same as in the first embodiment.

Figure 18:
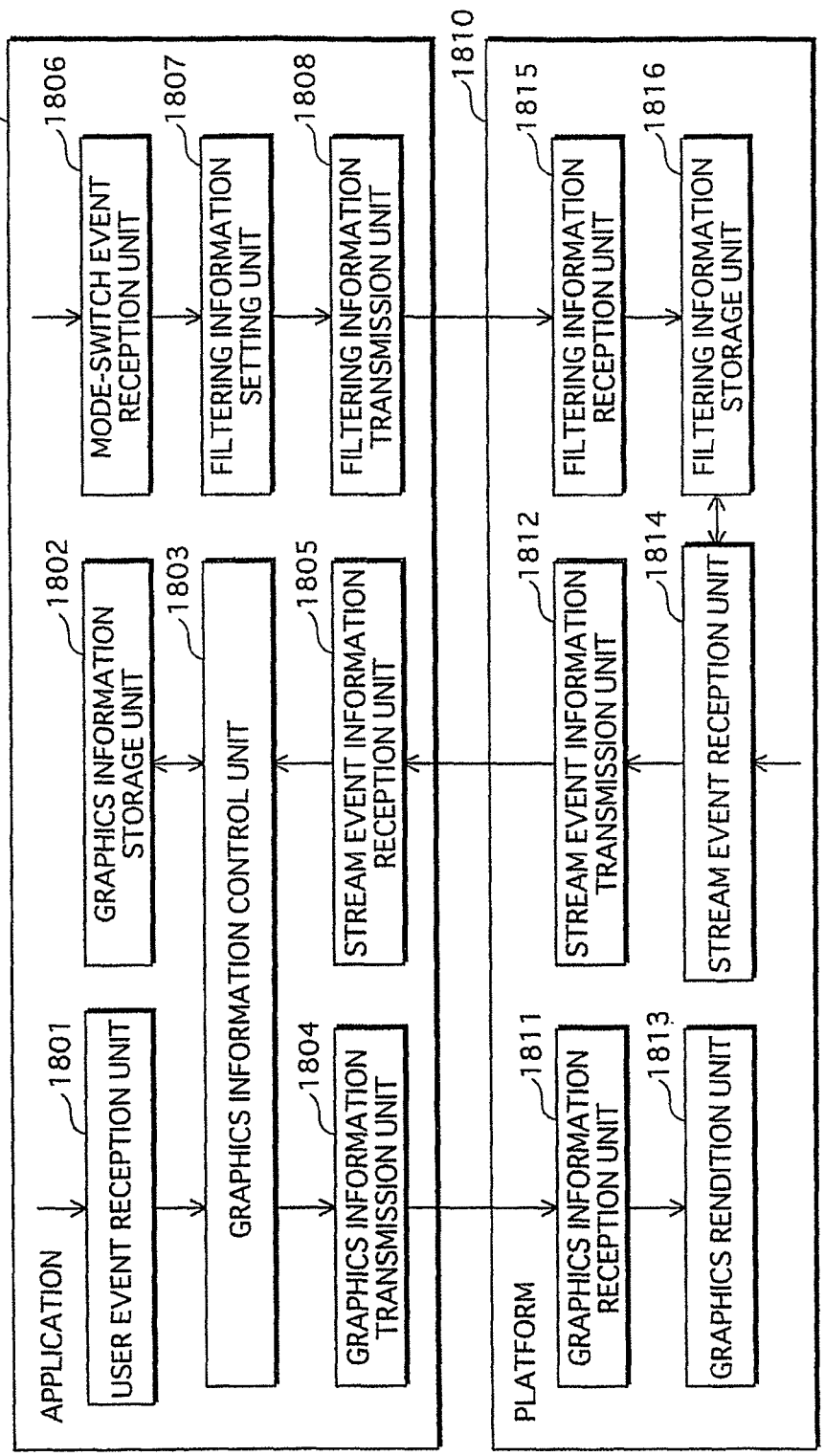
FIG. 18 is a functional structure diagram of an application and a platform of the third and fourth embodiments.

FIG. 18 is a functional block diagram of the application and the platform in the present embodiment.

An application 1800 receives a mode-switch event that occurs when the playback mode of the AV data is switched, and transmits the mode-switch event to a platform 1810.

Mode denotes the playback speed of AV data, an example of which being double speed. In order to switch the playback speed, the user switches the mode by operating the remote control or the like.

A mode-switch event denotes occurrence of a mode-switch operation by the user. The program processing unit 206 receives the mode-switch operation which has occurred according to the user operation, and transfers a mode-switch event, which indicates the operation, to the application 1800.

In addition to the structure of the application of the second embodiment, the application 1800 includes a mode-switch event reception unit 1806, a filtering information setting unit 1807, and a filtering information transmission unit 1808.

The following describes the structure of the application 1800.

The mode-switch event reception unit 1806 receives a mode-switch event that occurs when the mode in which the AV data is being played is switched, and extracts information (hereinafter referred to as mode-switch event information) from the mode-switch event.

Note that the mode-switch event information includes mode information about the mode before and after the mode switch.

The filtering information setting unit 1807 sets filtering information based on the mode-switch event information. This filtering information is for extracting stream events. If, for example, the user switches the mode from regular playback speed (1× speed) to double speed (2× speed), the filtering information indicates "2× speed".

The filtering information transmission unit 1808 transmits the set filtering information to the platform 1810.

In addition to the structure of the platform of the second embodiment, the platform 1810 includes a filtering information reception unit 1815, and a filtering information storage unit 1816.

The filtering information reception unit 1815 receives the filtering information from the application 1800.

The filtering information storage unit 1816 stores the received filtering information.

Figure 19:
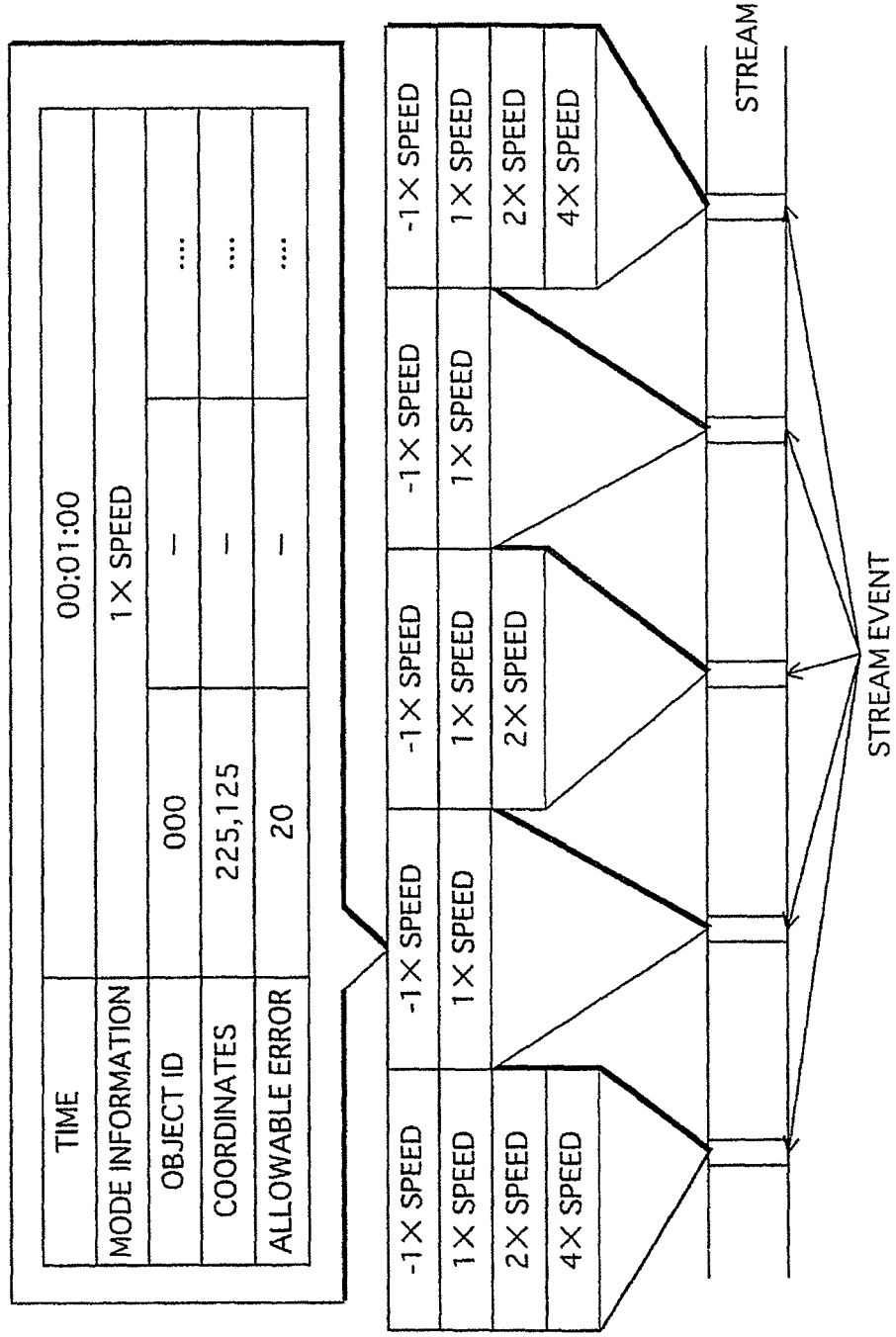
FIG. 19 shows an example of stream event information relating to the third embodiment.

FIG. 19 shows stream event information relating to the present embodiment.

The stream event information is the stream event information described in the earlier embodiments, with the addition of mode information.

Note that although the mode information described here indicates the playback mode of AV data currently being played here, the mode information may include a plurality of playback modes.

Operations

The following describes operation of the present embodiment.

Figure 20:
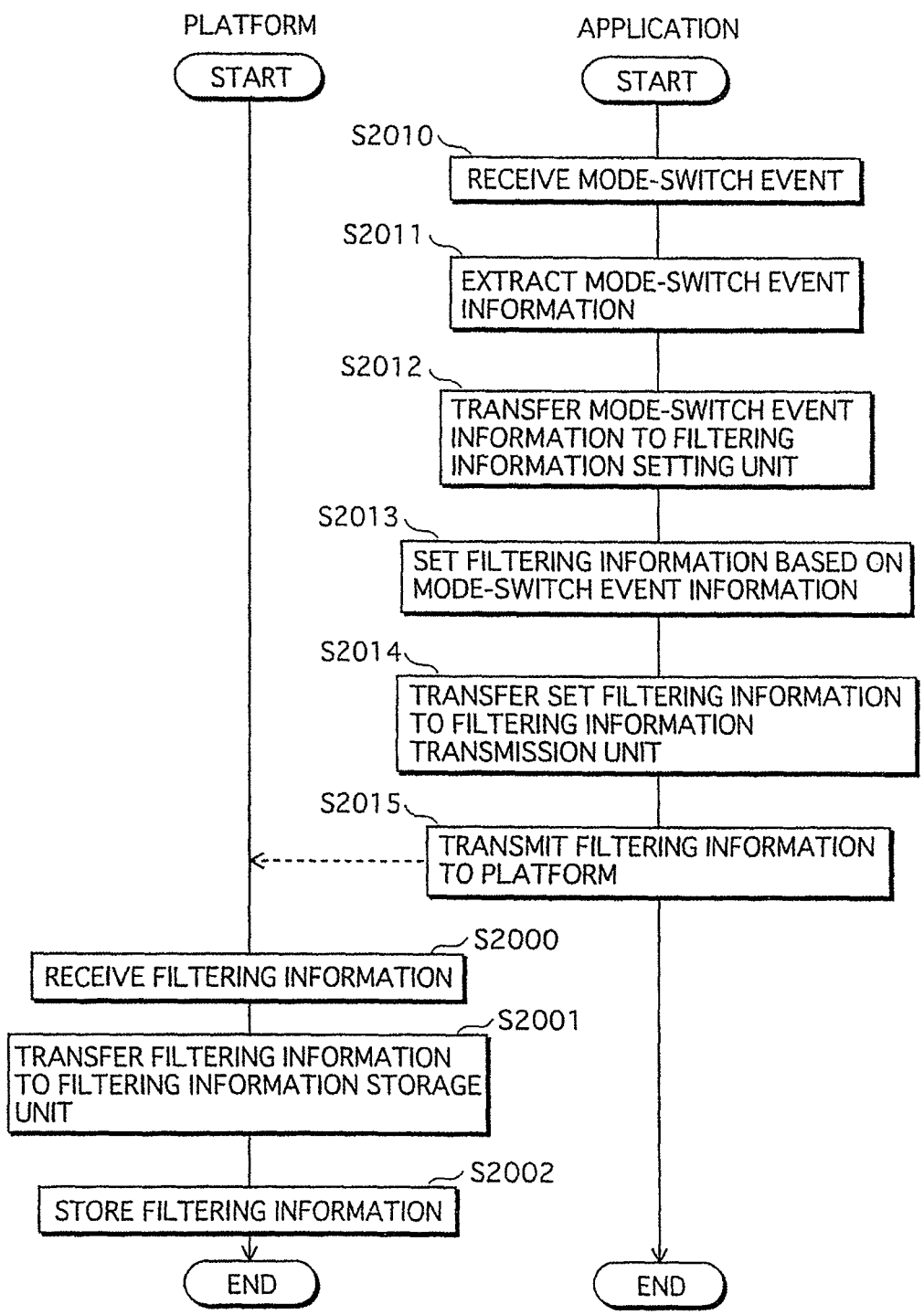
FIG. 20 is a flowchart showing filtering information setting processing when a mode-switch event occurs in the third and fourth embodiments.

FIG. 20 is a flowchart showing processing for transmitting filtering information from the application 1800 to the platform 1810 when the playback mode of the AV data has been switched according to a user operation.

When the mode has been switched according to a user operation, the mode-switch event information reception unit 1806 of the application 1800 receives mode-switch event from the program processing unit 206 (S2010).

The mode-switch event information reception unit 1806 extracts the mode-switch event information from the received mode-switch event (S2011), and transfers the mode-switch event information to the filtering information setting unit 1807 (S2012).

The filtering information setting unit 1807 sets filtering information based on the mode-switch event information (S2013), and transfers the filtering information to the filtering information transmission unit 1808 (S2014).

The filtering information transmission unit 1808 transmits the filtering information to the platform 1810 (S2015).

The filtering information reception unit 1815 of the platform 1810 receives the filtering information (S2000), and transfers the filtering information to the filtering information storage unit 1816 (S2001).

The filtering information storage unit 1816 stores the filtering information (S2002).

Note that on receiving a stream event from the presentation processing unit 208, the stream event reception unit 1814 extracts stream event information, based on the filtering information stored in the filtering information storage unit 1816 at step S2002.

The following describes processing for controlling graphics object rendition in response to a playback mode-switch event and a stream event.

Figure 21:
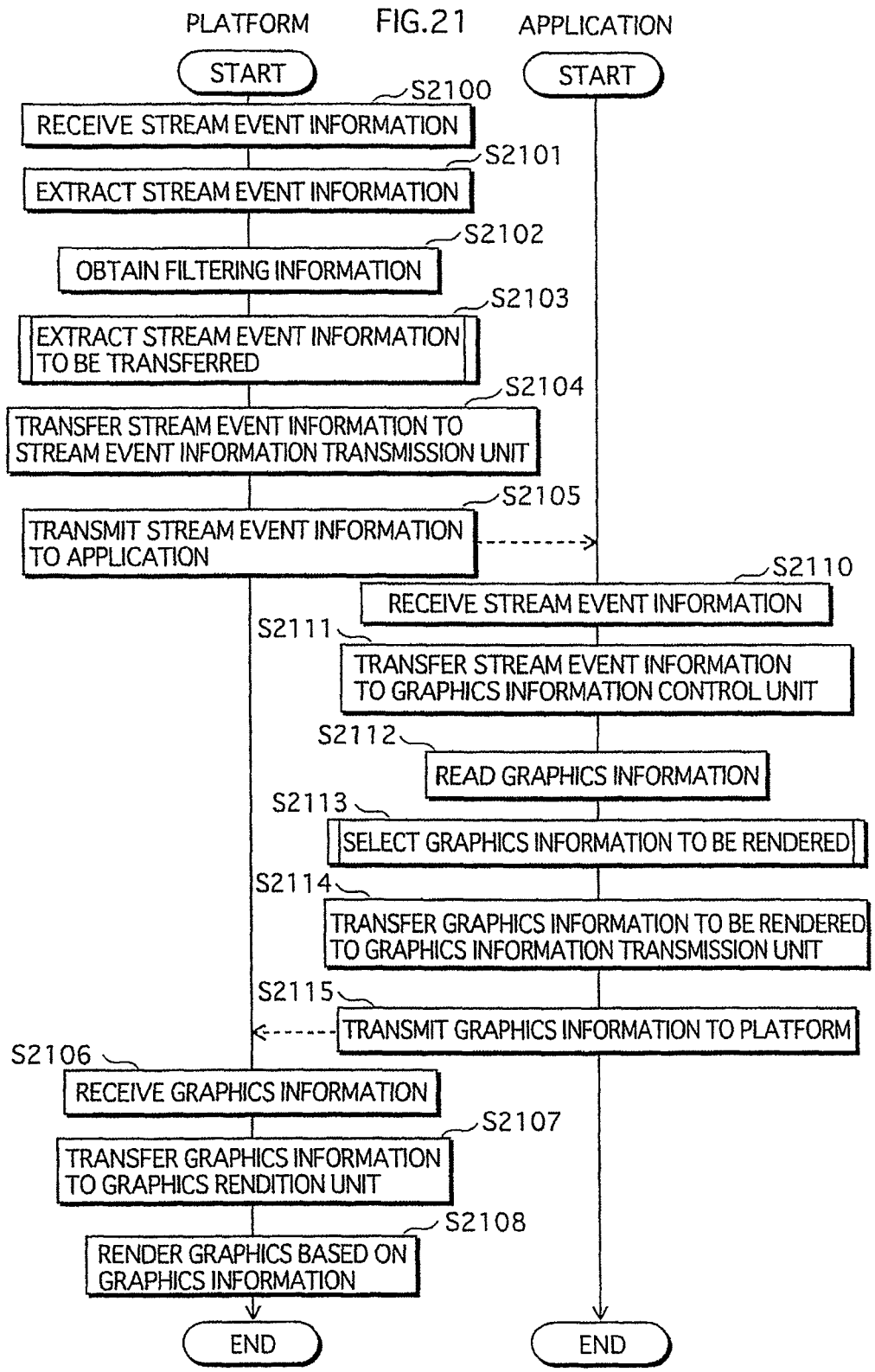
FIG. 21 is a flowchart showing processing for controlling graphics rendition when a stream event occurs in the third and fourth embodiments.

FIG. 21 is a flowchart showing processing for controlling graphics object rendition in the present embodiment.

Note that the flow of operations is described based on the assumption that, according to a mode-switch operation by the user, the operations shown in FIG. 20 have been performed, and that filtering information has been stored in the platform 1810.

At step S2100, the stream reception unit 1814 of the platform 1810 receives a stream event from the presentation processing unit 208 (S2100).

The stream event reception unit 1814 extracts the stream event information (S2101), and reads the filtering information from the filtering information storage unit 1810 (S2102).

Based on the filtering information, the stream event reception unit 1814 extracts stream event information (S2103), and transfers the extracted stream event information to the stream event information transmission unit 1812 (S2104).

The stream event information transmission unit 1812 transmits the stream event information to the application 1800 (S2105).

The stream event information reception unit 1805 of the application 1800 receives the stream event information (S2110).

The processing subsequent to step S2110 is the same as processing in the second embodiment (FIG. 12), and therefore a description thereof is omitted here.

Figure 22:
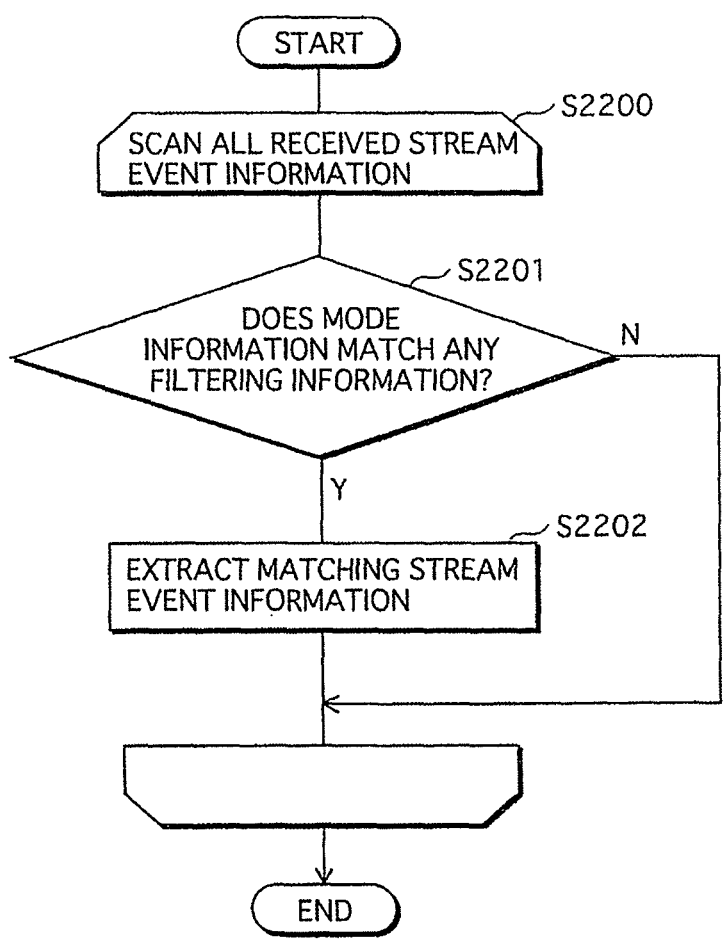
FIG. 22 is a flowchart showing processing for extracting stream event information in the third embodiment.

Referring to FIG. 22, the following describes processing for extracting stream event information.

At step S2200, the stream event reception unit 1814 scans all pieces of stream event information.

The stream event reception unit 1814 reads the filtering information from the filtering information storage unit 1816, and selects any filtering information that matches the mode information in any of the stream event information (S2201).

When stream event information whose mode information matches that of the filtering information has been selected at step S2201 (S2201:Y), the stream event reception unit 1814 extracts the transfers the selected stream event information (S2202).

Fourth Embodiment

In the above third embodiment, the stream event information has mode information included therein, and, for example, when a mode-switch event to switch the mode to double speed occurs, the stream event reception unit 1814 extracts only stream event information whose mode information shows "double speed", and transmits the extracted stream event information to the application.

In the present embodiment, the stream event information is the same as in the first and second embodiments. When a mode-switch event occurs, the stream event reception unit 1814 transmits stream events to the application with appropriate frequency in response to the mode-switch event.

Specifically, when a mode-switch event to switch to double speed occurs as described earlier, the stream event reception unit 1814 transmits every second stream event information to the application.

Note that the BD-ROM data hierarchy, the BD-ROM logical space structure, the outline of the BD-ROM playback apparatus, the structure of the BD-ROM playback apparatus, the structure of the MPEG stream, and the structure of the sections that convey stream events are the same as in the first embodiment.

Furthermore, the functional structure of the application is the same as in the third embodiment, but the functional structure of the platform differs in that the stream event reception unit 1814 includes a stream event counter.

Here, the stream event counter counts the stream event information along a time along a time-line, and stores the count.

Operations

The following describes processing for extracting the stream event information in the present embodiment.

Note that it is assumed that when a mode-switch event occurs during playback of AV data, filtering information is stored in the filtering information storage unit 1816 of the platform 1810.

Figure 23:
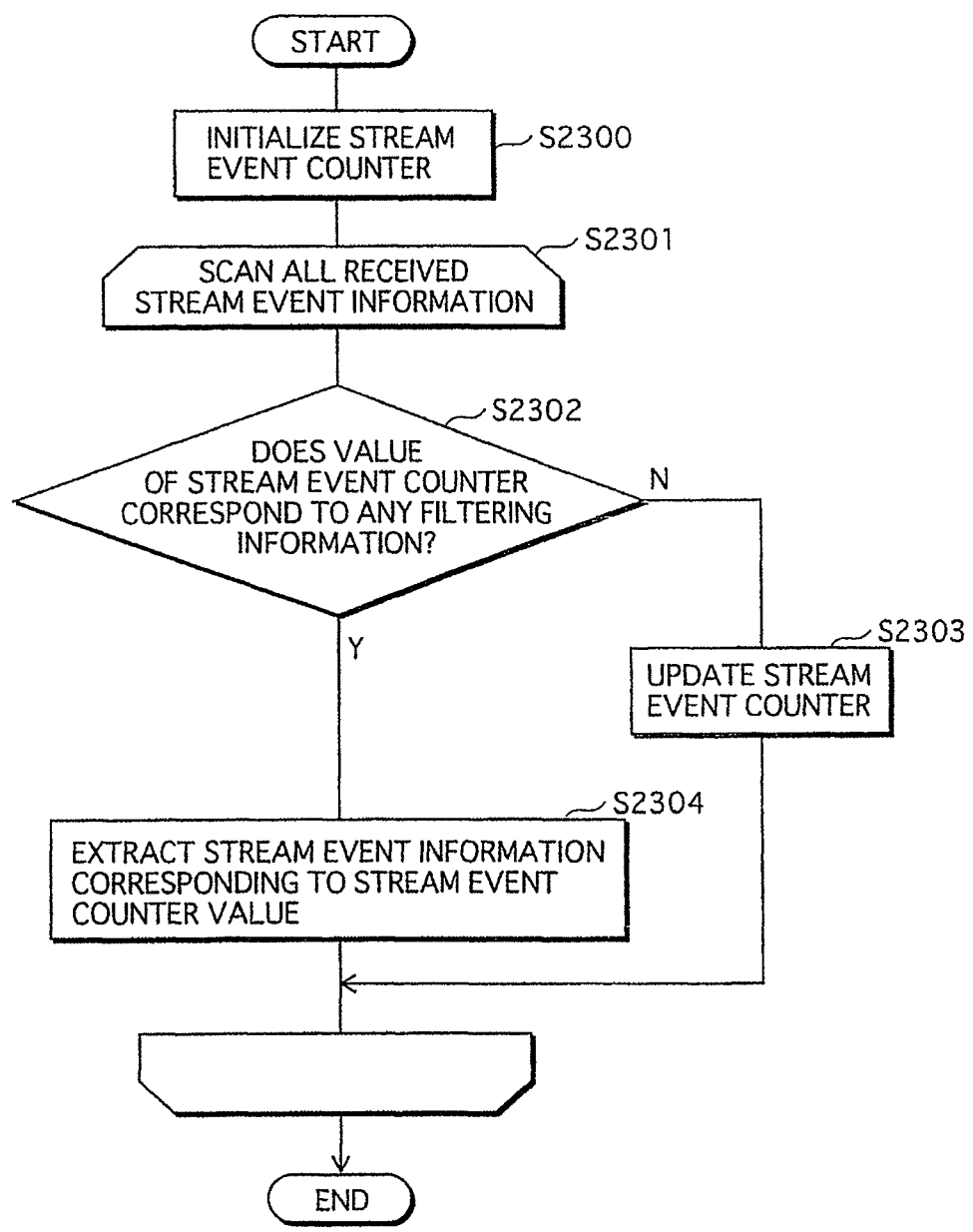
FIG. 23 is a flowchart showing processing for extracting stream event information in the fourth embodiment.

FIG. 23 is a flowchart showing processing for extracting stream event information.

At step S2300, the stream event reception unit 1814 initializes the stream event counter.

The stream event reception unit 1814 scans all received stream event information (step S2301), and refers to the value of the stream event counter to select any stream event information (either one or a plurality or pieces of stream event information) that corresponds to the filtering information (S2302).

As one specific example, if the filtering information indicates "double speed", the stream event reception unit 1814 determines whether the count of the stream event counter is a multiple of two.

Note that the application may directly set the filtering information as an integer.

At step S2302, when the stream event reception unit 1814 has selected stream event information that corresponds to the filtering information (step S2302:Y), the stream event reception unit 1814 extracts the selected stream event information to the stream event information transmission unit 1812 (S2304).

Furthermore, if the stream event reception unit 1814 has not selected any stream event information that corresponds to the filtering information at step S2302 (step S2302:N), the stream event reception unit 1814 updates the counter (step S2303).

SUPPLEMENTARY REMARKS

Although the present invention has been described based on the first to fourth embodiments, the present invention may be modified as described below, and is not limited to the playback apparatus shown in the above embodiments.

(1) Although the program in the first embodiment is described as operating in coordination with one AV stream, a plurality of types of AV streams may be stored on the BD, and the program may operate in coordination with these AV streams.

One example is a case in which the program is executed before the AV data is played. Here, a playback menu or the like is displayed, and when the user has selected AV data for playback, the platform 1410 receives graphics information corresponding to the selected AV data. By the platform receiving graphics information corresponding to each type of AV data in this way, when AV data playback has been instructed, graphics can be rendered in coordination the AV stream being played without providing a program for each AV stream.

(2) In the described embodiments all the graphics information is received by the graphics information control unit of the platform or the application at the time of initiating the application. However, the graphics information control unit may instead receive graphics information, for example, every ten minutes during AV stream playback. In such a case, the amount of graphics information received at once is less than when all the graphics information is received and stored in the graphics information storage unit, and therefore the capacity of the graphics information storage unit can be reduced.

(3) Although the descriptions in the above embodiments pertain to a case in which a single application operates on the platform, the present invention may also be applied to a case in which a plurality of applications operate.

For example, if two game applications operate on the platform, the platform receives graphics information from both the applications at the time of the applications being initiated.

When a stream event occurs, the graphics information control unit 1414 selects graphics information corresponding to the respective games, and has the graphics rendition unit 1415 render graphics corresponding to the respective games.

(4) In the above embodiments, the platform has graphics objects rendered based on predetermined graphics information in the application. However, this may be switched to other AV data recorded on the same BD as the AV data being played back.

(5) In the third and fourth embodiments, the user switches the playback mode between predetermined modes. However, the user may instead use a joystick or the like to designate a playback speed, and filtering information may be set for a predetermined mode that corresponds to the designated playback speed.

(6) supposing a case in which rendering of new graphics on the image plane must be instructed despite the fact that rendering of graphics that has already been instructed is not complete. In such cases where graphics rendition on the image plane is not able to be performed in time, the platform be omit rendition of some graphics as appropriate.

(7) Although it is the application that sets the filtering information in the above third and fourth embodiments, the platform may instead set the filtering information based on the mode-switch event information.

In this case, the application transfers the mode-switch event information to the platform, and, based on the received mode-switch information, the platform determines graphics information to be rendered.

(8) In the fourth embodiment, when the value held by the stream event counter corresponds to the filtering information, that stream event information is extracted. However, information identical to the stream event counter (hereinafter this information is referred to as counter information) may instead be incorporated in the stream event information.

As one example of such a case, if the filtering information is "double speed", only stream event information in which the lowest bit of the counter information is "0" is extracted and transmitted to the application. If the filtering information is "4× speed", only stream event information in which the two lowest bits of the counter information is "00" is extracted and transmitted to the application.

Furthermore, the application may set the filtering information more specifically, such that when the counter information has a particular bit value, only stream event information having a predetermined value is extracted.

(9) In the above embodiments, descriptions were given of rendering graphics in response to a stream event embedded in advance in the AV data being played. However, the graphics may instead be rendered based on time information showing timing for playing video of the AV data.

INDUSTRIAL APPLICABILITY

The playback apparatus of the present invention executes a program that operates in coordination with an AV data stream being played, and renders graphics in coordination with the AV data stream. Therefore, the present invention can be used in the movie industry and the commercial device industry engaged in manufacturing of devices that process AV data streams. The present invention is usable as a BD-ROM disc, a BD-ROM player, or the like.

The invention claimed is:

1. A playback apparatus, comprising:
a reader configured to read a video stream, playlist information, a plurality of images, and an application program from a recording medium, the video stream including video data and playback times individually assigned to pieces of the video data, the playlist information specifying the playback times assigned to the pieces of the video data to be played back, the application program being used for superimposing the plurality of images onto the video data, the application program including graphics information that specifies rendition times individually assigned to each of the plurality of images;
a scenario processor configured to analyze the playlist information to read the playback times assigned to the pieces of the video data to be played back;
a player configured to decode the video stream to play back the video data according to the playback times read by the scenario processor;
a platform configured to execute the application program during playback of the video data;
a storage configured to follow an instruction that the platform issues according to the application program to store the plurality of images and the rendition times, included in the application program, into a memory device;
an image selector configured to receive the time information playback times from the player during the playback of the video data, and when one of the playback times received from the player corresponds to a specific one of the rendition times stored in the memory device, to select one image, to which the specific one of the rendition times is assigned, from the plurality of images stored in the memory device;
a renderer configured to render the one image into an image plane; and
a composer configured to superimpose the one image rendered in the image plane onto the video data during the playback of the video data.

2. The playback apparatus of claim 1, wherein the platform includes an interface configured to receive an input from the application program, and to use the input to issue the instruction.

3. The playback apparatus of claim 1, wherein
the player includes a decoder and a video plane, uses the decoder to decode the video data, and stores the decoded video data into the video plane according to the time information playback times read by the scenario processor, and
the composer superimposes the one image rendered in the image plane onto the decoded video data in the video plane.

4. A method of using a playback apparatus, comprising:
reading a video stream, playlist information, a plurality of images, and an application program from a recording medium, the video stream including video data and playback times individually assigned to pieces of the video data, the application program being used for superimposing the plurality of images onto the video data, the application program including graphics information that specifies rendition times individually assigned to each of the plurality of images;
analyzing the playlist information and reading the playback times assigned to the pieces of the video data to be played back;
decoding the video stream and then playing back the video data according to the read playback times;
executing the application program during playback of the video data;
following an instruction issued according to the application program to store the plurality of images and the rendition times, included in the application program, into a memory device;
receiving the playback times during the playback of the video data, and when one of the playback times corresponds to a specific one of the rendition times stored in the memory device, selecting one image, to which the specific one of the rendition times is assigned, from the plurality of images stored in the memory device;
rendering the one image into an image plane; and
superimposing the one image rendered in the image plane onto the video data during the playback of the video data.

\* \* \* \* \*